(12) United States Patent
Yerushalmi et al.

(10) Patent No.: US 11,979,314 B2
(45) Date of Patent: May 7, 2024

(54) HIERARCHICAL PATH SELECTION IN A COMMUNICATION NETWORK

(71) Applicant: Marvell Israel (M.I.S.L) Ltd., Yokneam (IL)

(72) Inventors: Ilan Yerushalmi, Hod Hasharon (IL); Adar Peery, Aseret (IL); David Melman, Tel Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 18/078,727

(22) Filed: Dec. 9, 2022

(65) Prior Publication Data
US 2023/0188459 A1 Jun. 15, 2023

Related U.S. Application Data

(60) Provisional application No. 63/287,919, filed on Dec. 9, 2021.

(51) Int. Cl.
*G06F 15/16* (2006.01)
*H04L 45/02* (2022.01)
*H04L 45/24* (2022.01)
*H04L 45/745* (2022.01)

(52) U.S. Cl.
CPC .............. *H04L 45/24* (2013.01); *H04L 45/04* (2013.01); *H04L 45/745* (2013.01)

(58) Field of Classification Search
CPC ........ H04L 45/04; H04L 45/24; H04L 45/745
USPC ........................................................ 709/238
See application file for complete search history.

(56) References Cited

U.S. PATENT DOCUMENTS

| | | | | |
|---|---|---|---|---|
| 6,775,235 B2 * | 8/2004 | Datta | .................. | H04L 63/1466 370/252 |
| 7,760,718 B2 * | 7/2010 | Kamath | .................. | H04L 45/26 370/386 |
| 7,817,636 B2 * | 10/2010 | Sankaran | ................ | H04L 45/38 709/239 |
| 8,094,659 B1 | 1/2012 | Arad | | |
| 8,103,773 B2 * | 1/2012 | Krishnan | ............ | H04L 41/0896 709/226 |
| 8,279,871 B1 | 10/2012 | Sivan et al. | | |
| 8,385,353 B2 * | 2/2013 | Salam | ................. | H04L 43/0811 370/255 |
| 8,625,594 B2 | 1/2014 | Safrai et al. | | |
| 8,756,424 B2 | 6/2014 | Roitshtein et al. | | |
| 9,203,735 B2 | 12/2015 | Melman et al. | | |
| 9,258,219 B1 | 2/2016 | Safrai et al. | | |

(Continued)

OTHER PUBLICATIONS

International Search Report and Written Opinion for PCT No. PCT/IB2022/062014, dated Feb. 8, 2023 (15 pages).

*Primary Examiner* — Moustafa M Meky

(57) ABSTRACT

A network device includes a plurality of network interfaces configured to couple with a plurality of physical network links. A packet processor is configured to process packets received via the plurality of network interfaces. The packet processor includes a path selection engine that is configured to: for each of at least some packets processed by the packet processor, successively make path selection decisions that correspond to respective routing domains within a hierarchical communication network, the path selection decisions for forwarding the packet through the hierarchical communication network.

20 Claims, 9 Drawing Sheets

(56) References Cited

U.S. PATENT DOCUMENTS

| | | | |
|---|---|---|---|
| 9,344,328 B1 | 5/2016 | Bishara | |
| 9,350,654 B1* | 5/2016 | Gredler | H04L 45/507 |
| 9,467,367 B2* | 10/2016 | Bryant | H04L 45/50 |
| 9,584,443 B2* | 2/2017 | Sung | H04L 69/22 |
| 9,614,759 B2* | 4/2017 | Janardhanan | H04L 45/66 |
| 9,876,719 B2 | 1/2018 | Revah et al. | |
| 10,110,491 B2* | 10/2018 | Mack-Crane | H04L 45/66 |
| 10,243,857 B1 | 3/2019 | Mizrahi et al. | |
| 10,735,325 B1 | 8/2020 | Singh | |
| 11,038,834 B2* | 6/2021 | Tourrilhes | H04L 45/02 |
| 11,171,866 B2* | 11/2021 | Kini | H04L 41/0816 |
| 2002/0087724 A1* | 7/2002 | Datta | H04L 47/125 |
| | | | 709/241 |
| 2008/0186897 A1* | 8/2008 | Rune | H04L 45/00 |
| | | | 370/315 |
| 2014/0153437 A1* | 6/2014 | Tracy | H04L 45/484 |
| | | | 370/254 |
| 2014/0269714 A1* | 9/2014 | Bryant | H04L 45/50 |
| | | | 370/392 |
| 2014/0293786 A1 | 10/2014 | Lin et al. | |
| 2017/0222926 A1* | 8/2017 | Mack-Crane | H04L 45/72 |
| 2019/0238497 A1* | 8/2019 | Tourrilhes | H04L 45/74 |
| 2021/0160350 A1* | 5/2021 | Volpe | H04L 67/563 |
| 2022/0078137 A1 | 3/2022 | Huynh et al. | |

* cited by examiner

HIERARCHICAL PATH SELECTION IN A COMMUNICATION NETWORK

CROSS REFERENCE TO RELATED APPLICATIONS

This application claims the benefit of U.S. Provisional Patent Application No. 63/287,919, entitled "Hierarchical Equal Cost Multi-Path (ECMP) with Fast ReRoute (FRR)," filed on Dec. 9, 2021, which is hereby incorporated herein by reference in its entirety.

FIELD OF TECHNOLOGY

The present disclosure relates generally to communication networks, and more particularly to forwarding packets via alternative network paths.

BACKGROUND

Much of the present day's data communications are routed over provider networks. Packets enter and exit a provider network via a plurality of provider edge (PE) network devices. Large provider networks have large numbers of PE network devices and large numbers of alternative paths through the provider network. When packets arrive at a PE network device, the PE network device typically makes forwarding decisions that govern the paths through the provider network, from among many alternative paths, that the packets will travel. Additionally, when communication links and/or network devices within the provider network become congested or fail, a PE network device often makes re-routing decisions that cause flows of packets to be re-routed through the provider network to avoid congestion or failed links/devices. As provider networks continue to grow in size and complexity, the forwarding and re-routing decisions made by PE network devices is also growing in complexity.

SUMMARY

In an embodiment, a network device comprises: a plurality of network interfaces configured to couple with a plurality of physical network links; and a packet processor configured to process packets received via the plurality of network interfaces. The packet processor includes a path selection engine that is configured to: for each of at least some packets processed by the packet processor, successively make path selection decisions that correspond to respective routing domains within a hierarchical communication network, the path selection decisions for forwarding the packet through the hierarchical communication network.

In another embodiment, a method for processing packets in a network device includes: receiving packets via a plurality of network interfaces of the network device, the plurality of network interfaces coupled to a plurality of physical network links; and processing, by a packet processor of the network device, packets received via the plurality of network interfaces, including: for each of at least some packets processed by the packet processor, successively making path selection decisions that correspond to respective routing domains within a hierarchical communication network, the path selection decisions for forwarding the packet through the hierarchical communication network.

DETAILED DESCRIPTION

Figure 1:
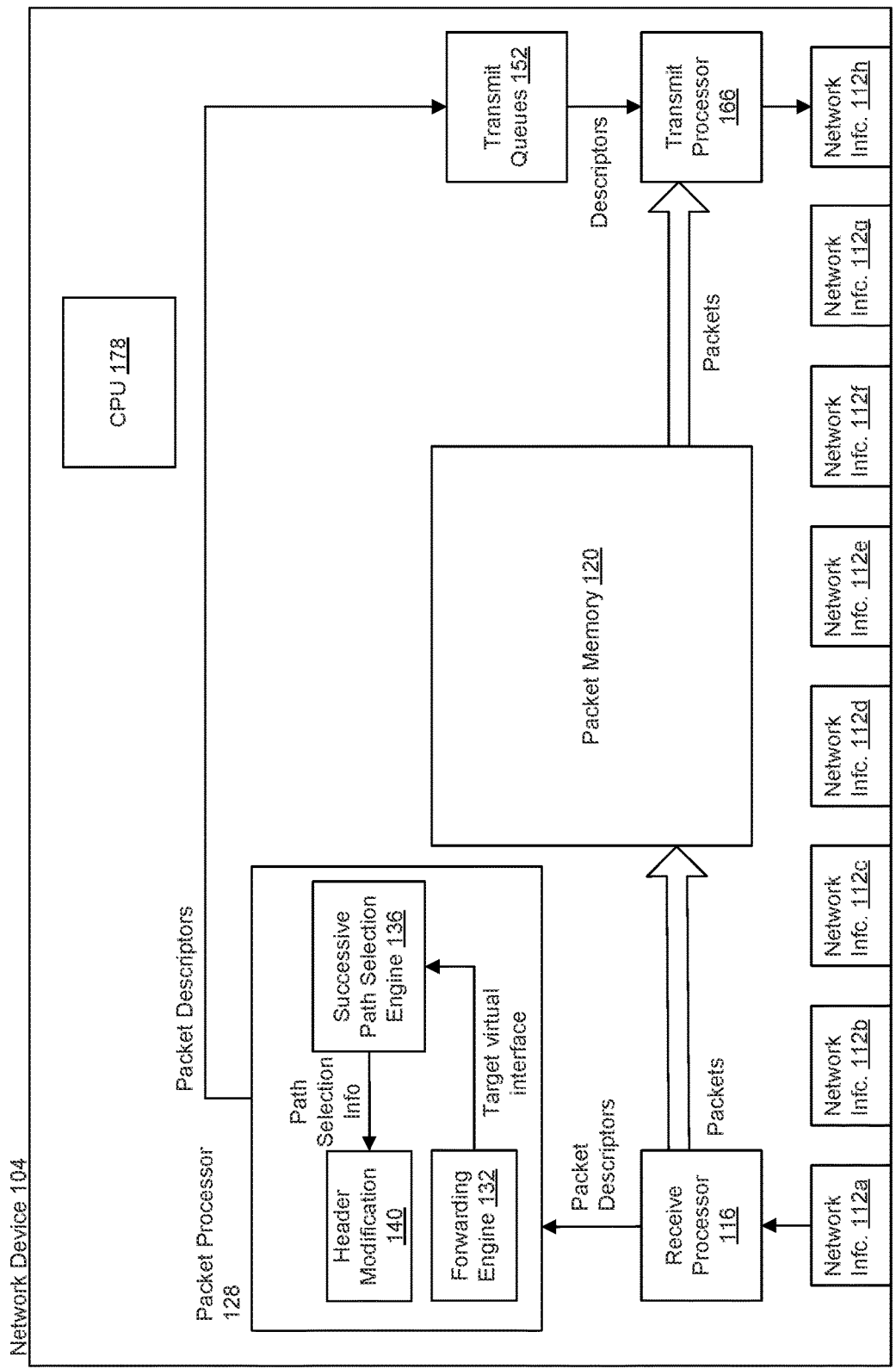
FIG. 1 is a block diagram of an example network device that includes a successive path selection engine that successively makes path selection decisions that correspond to respective routing domains within a hierarchical communication network, according to an embodiment.

Some provider networks are structured hierarchically. For example, a provider network may comprise a plurality of aggregation networks that each comprise a plurality of provider edge (PE) network devices for interfacing with outside networks. Additionally, the provider network also comprises a core network that interconnects the plurality of aggregation networks, where each aggregation network is coupled to the core network via one or more border network devices. The core network and each of the aggregation networks corresponds to a respective routing domain, in some embodiments. When a packet is entering the provider network via an aggregation network, the aggregation network is operating as an ingress network. Similarly, when a packet is exiting the provider network via an aggregation network, the aggregation network is operating as an egress network.

For any given packet entering a hierarchically structured communication network (sometimes referred to herein as a "hierarchical network"), there are typically at least several alternative paths through the ingress network, many alternative paths through the core network, and at least several alternative paths through the egress network, i.e., there are large number of permutations of alternative paths through the hierarchical network as a whole.

For purposes of load balancing, a conventional PE network device maintains tables corresponding to alternative paths through the provider network from entry points in the provider network to a customer network device that is coupled to one or more exit points in the provider network. As the size and complexity of hierarchical networks continues to grow, however, the number of permutations of alternative paths in a hierarchical network continues to grow. As a result, the tables maintained by conventional PE network devices can become very large. Additionally, the complexity of re-routing decisions triggered by congestion, link failure, and/or device failure within the hierarchical network increases as the size and complexity of hierarchical networks continues to grow. Further, conventional path selection and path re-routing techniques do not scale well as size and complexity of hierarchical networks grow.

In embodiments described below, a network device, such as PE network device of a hierarchical network, successively makes path selection decisions that correspond to respective routing domains within the hierarchical network, the selection decisions for a packet to be forwarded through the hierarchical network. In some embodiments, a first path selection decision made for a first routing domain constrains a second path selection decision made for a second routing domain as a result of successively making path selection decisions that correspond to respective routing domains. Use of a successive path selection technique such as described herein results in one or more (or none) of: i) reduced memory requirements for path selection tables of the network device, ii) decreased time required to make re-routing decisions, iii) improved scalability with regard to increasing size and/or complexity of provider networks, etc.

FIG. 1 is a simplified block diagram of an example network device 104 that successively makes path selection decisions that correspond to respective routing domains in a communication network, according to an embodiment. In some embodiments, the network device 104 is configured to operate as a provider edge (PE) network device of a hierarchical communication network (sometimes referred to herein as a "hierarchical network"), i.e., the communication network is a hierarchical network.

The network device 104 includes a plurality of network interfaces 112 configured to couple to respective network links in the communication network. The network device 104 also includes one or more receive processors 116 coupled to the network interfaces 112. Although only one receive processor 116 is shown in FIG. 1 merely for ease of explanation, and the one receive processor 116 is shown as being coupled to only one network interface 112, the network device 104 includes multiple receive processors 116 and each of the multiple processors 116 is coupled to a respective set of one or more network interface 112, in some embodiments. The multiple receive processors 116 may be considered collectively as a single receive processor.

The receive processor 116 is configured to store packet data (e.g., at least payloads) corresponding to received packets in a packet memory 120.

In some embodiments, the receive processor 116 stores an entire received packet in the packet memory 120. In other embodiments, the receive processor 116 stores, for each of multiple packets, only an end portion of a received packet (e.g., including a payload and optionally a portion of a header) in the packet memory 120 at least initially. At least a portion of a header of the received packet is later stored in the packet memory 120 by the network device 104, according to an embodiment.

In an embodiment, the receive processor 116 includes direct memory access (DMA) circuitry (not shown) configured to store received packets (or at least portions of the packets) in the packet memory 120 via one or more read/write interfaces of the packet memory 120.

The receive processor 116 generates, for each of multiple packets received via network interfaces 112, a packet descriptor associated with the packet, according to an embodiment. Each packet descriptor includes information regarding the corresponding packet, such as header information from a header of the packet and optionally control information associated with the packet, such as location information regarding a location of the corresponding packet in the packet memory 120, according to an embodiment.

Each packet descriptor has a data length that is much shorter than a length of a typical packet, according to some embodiments. In an embodiment, the receive processor 116 is configured to extract header information from a received packet and store the extracted header information in a packet descriptor corresponding to the received packet.

In some embodiments, the receive processor 116 is configured to extract a fixed length of packet data from a beginning portion of a received packet and store the extracted information in a packet descriptor corresponding to the packet. For example, the receive processor 116 is configured to i) extract a first 128 bytes (or another suitable length) of packet data from the beginning portion of the packet and store the extracted information in the packet descriptor, according to an illustrative embodiment.

The receive processor 116 provides the packet descriptors to a packet processor 128, which is configured to process packets (e.g., by analyzing packet descriptors corresponding to the packets), in an embodiment. In other embodiments, the receive processor 116 (or the packet processor 128) stores packet descriptors in a packet descriptor memory (not shown) separate from the internal packet memory 120, and the packet processor 128 processes the packet descriptors stored in the packet descriptor memory. In such embodiments, a smaller packet descriptor includes an indicator of a location of the packet descriptor in the packet descriptor memory, and the smaller packet descriptor is passed between components of the packet processor 128. In such embodiments, the indicator (within the smaller packet descriptor) of the location of the packet descriptor in the packet descriptor memory is used by components of the packet processor 128 to access the packet descriptor. In some embodiments, the smaller packet descriptor optionally includes control information associated with the packet, such as location information regarding a location of the corresponding packet in the internal packet memory 120.

The packet processor 128 includes a forwarding engine 132. The forwarding engine 132 is configured to analyze at least header information in packet descriptors to determine network interfaces via which packets (corresponding to the packet descriptors) are to be transmitted (referred to herein as "target network interfaces"). As merely an illustrative example, the forwarding engine 132 is configured to use at least a destination address in a header of a packet to perform a lookup in a forwarding database (not shown), which stores correspondences between destination addresses and network interfaces, to determine a target network interface for the packet. As another illustrative example, the forwarding engine 132 is configured to use at least a VLAN ID in a header of a packet to perform a lookup in a forwarding database (not shown) (e.g., the same forwarding database discussed above or a different forwarding database), which stores correspondences between VLAN IDs and network interfaces, to determine a particular set of one or more target network interfaces 112 for the packet. The forwarding engine 132 is configured to store an ID of a target network interface (or set of multiple target network interfaces) in the packet descriptor corresponding to the packet, according to an embodiment.

Target network interfaces comprise physical network interfaces 112 and virtual network interfaces, according to some embodiments. Virtual network interfaces indicate one or more of i) a group of physical network interfaces 112 that correspond to a link aggregate group (LAG), ii) a group of physical network interfaces 112 that correspond to an equal cost multipath (ECMP) group, iii) a network tunnel having multiple alternative paths through the communication network, iv) a set of multiple network tunnels having multiple alternative paths through the communication network, etc., according to various embodiments. In some embodiments, each of at least some virtual network interfaces correspond to a network tunnel (or a set of network tunnels) having multiple alternative paths through a hierarchical network. As discussed above, there may be many permutations of alternative paths through a hierarchical network, at least in some embodiments.

The packet processor 128 also includes a successive path selection engine 136 that is configured to successively make path selection decisions, for each of at least some virtual target network interfaces, that corresponds to a respective group of paths through the communication network. In some embodiments, successively making path selection decisions includes making respective path selection decisions for multiple routing domains in the communication network, where a first path selection decision for a first routing domain is used to make a second path selection decision for a second routing domain. In some embodiments, the first path selection decision constrains the second path selection decision. For example, the first path selection decision constrains possible paths that can be used through the second routing domain and thus constrains the second path selection decision, according to some embodiments. The successive path selection engine 136 is described in more detail below.

In an embodiment, the successive path selection engine 136 receives packet descriptors (or portions of packet descriptors relevant to the successive path selection engine 136, e.g., indications of virtual target network interfaces) and makes path selection decisions in connection with packet descriptors that indicate a path selection decision should be made by the successive path selection engine 136. For example, some values of virtual target network interfaces indicate to the successive path selection engine 136 that path selection decisions are to be made by the successive path selection engine 136, whereas other values of virtual target network interfaces (or values corresponding to physical target network interfaces) indicate to the successive path selection engine 136 that no path selection decisions are to be made by the successive path selection engine 136. As another example, the packet descriptors include another indicator (e.g., a flag) that indicates whether path selection decisions are to be made by the successive path selection engine 136. In some embodiments, the packet processor 128 provides to the successive path selection engine 136 packet descriptors for which path selection decisions are to be made by the successive path selection engine 136, and does not provide to the successive path selection engine 136 packet descriptors for which the successive path selection engine 136 is not to make path selection decisions.

In some embodiments, when the successive path selection engine 136 makes path selection decisions in connection with a packet descriptor, the successive path selection engine 136 stores indications of the path selection decisions within the packet descriptor. In other embodiments, when the successive path selection engine 136 makes path selection decisions in connection with a packet descriptor, the successive path selection engine 136 outputs indications of the path selection decisions separate from the packet descriptor.

In some embodiments, path selection decisions made by the successive path selection engine 136 includes selecting physical target network interfaces 112 that are to transmit packets corresponding to packet descriptors, and the successive path selection engine 136 outputs indications of the physical target network interfaces 112 for the packets (e.g., within the packet descriptors or separate from the packet descriptors).

In some embodiments, when no path selection decision is to be made by the successive path selection engine 136 in connection with a packet descriptor, the successive path selection engine 136 does not modify the packet descriptor. In some embodiments, when no path selection decision is to be made by the successive path selection engine 136 in connection with a packet descriptor, processing of the packet descriptor by the packet processor 128 includes skipping or bypassing the successive path selection engine 136.

The packet processor 128 also includes a header modification engine 140 that is configured to selectively modify header information (e.g., change a next hop network address, add a tunneling header, remove a tunneling header, etc.) in a packet that is to be transmitted via one or more of the network interfaces 112. When the successive path selection engine 136 makes path selection decisions in connection with a packet descriptor, the header modification engine 140 receives indications of the path selection decisions made by the successive path selection engine 136 and uses the indications of the path selection decisions to modify a header of a packet corresponding to the packet descriptor, such as by adding one or more tunneling headers that correspond to the path selection decisions. At least in some embodiments in which the packet header is stored in the packet descriptor, the header modification engine 140 modifies the packet header within the packet descriptor. At least in some embodiments in which the packet header is stored in the packet memory 120 (or another memory separate from the packet memory 120), the header modification engine 140 modifies the packet header stored in the packet memory 120 (or in the other memory separate from the packet memory 120).

The packet processor 128 optionally also includes one or more other suitable components that are not shown in FIG. 1 and not described in detail for purposes of brevity, such as one or more of: a header modification engine, a tunnel termination engine that identifies packets corresponding to network tunnels that terminate at the network device 104, a traffic shaping engine, etc.

At least in some embodiments in which the packet header is stored in the packet descriptor, after a packet descriptor has been processed by at least the header modification engine 140, the packet processor 128 stores the header information in the packet memory 120 (or the other memory separate from the packet memory 120. In embodiments in which the header information is stored in the packet memory 120, the header information is stored proximate to a location at which a remaining portion of the packet (e.g., at least the payload) is stored. In other embodiments, the header information is stored in the packet memory 120 at a different location than the location at which the remaining portion of the packet is stored.

In some embodiments, the packet processor 128 modifies the packet descriptor to include one or more indications of the locations in the packet memory 120 (or the other memory (not shown)) at which the header information is stored.

In some embodiments in which the packet processor 128 stores the header information in the packet memory 120 (or the other memory (not shown)) after the packet descriptor has been processed by at least the header modification engine 140, the packet processor 128 shortens the packet descriptor by removing the header information, or creates a new packet descriptor that omits the header information.

The network device 104 further comprises transmit queues 152 for scheduling the transmission of packets via the network interfaces 112. In an embodiment, a respective set of one or more transmit queues corresponds to a respective physical network interface 112. For example, a set of different transmit queues 152 corresponds to a single physical network interface 112, with each transmit queue 152 in the set corresponding to a different priority level according to which packets are to be transmitted via the single physical network interface 112.

The packet processor 128 stores the packet descriptors into appropriate transmit queues 152 corresponding to appropriate physical target network interfaces 112, according to an embodiment. For example, the packet processor 128 analyzes information in the packet descriptors (e.g., physical target network interface indicators, priority level information, etc.) to determine appropriate transmit queues 152 into which the packet descriptors are to be stored. As an illustrative example, respective pluralities of transmit queues 152 correspond to respective physical network interfaces 112, where each transmit queue 152 corresponding to a single physical network interface 112 also corresponds to a respective priority level, according to an embodiment. At least some of the transmit queues 152 are arranged as first-in-first-out (FIFO) linked lists, according to an embodiment.

After a packet descriptor reaches a head of a transmit queue 152 and a corresponding physical target network interface 112 is ready to receive a packet for transmission, the packet descriptor is dequeued from the transmit queue 152 and provided to a transmit processor 166 that corresponds to the physical target network interface 112. Although only one transmit processor 166 is shown in FIG. 1 merely for ease of explanation, and the one transmit processor 166 is shown as being coupled to only one physical network interface 112, the network device 104 includes multiple transmit processors 166 and each of the multiple transmit processors 166 is coupled to a respective set of one or more physical network interfaces 112, in some embodiments. The multiple transmit processors 166 may be considered collectively as a single transmit processor.

The transmit processor 166 retrieves packet data corresponding to the packet descriptor from the packet memory 120 via the one or more read/write interfaces of the packet memory 120. In an embodiment, the transmit processor 166 includes DMA circuitry configured to retrieve packets (or at least payloads of the packets) in the packet memory 120 via the one or more read/write interfaces of the packet memory 120.

In an embodiment, the packet descriptor includes location information that indicates locations in the packet memory 120 of the corresponding packet, and the transmit processor 166 uses the location information to retrieve packet data corresponding to the packet descriptor from the packet memory 120. The transmit processor 166 then provides the packet data to the physical network interface 112 for transmission. In an embodiment in which the transmit processor 166 includes DMA circuitry, the transmit processor 166 uses the location information in the packet descriptor to configure the DMA circuitry to retrieve packet information corresponding to packet from the packet memory 120; the DMA circuitry then retrieves the packet information corresponding to the packet from the packet memory 120 and provides the packet information to the physical network interface 112 for transmission.

The network device 104 further comprises a central processing unit (CPU) 178 coupled to the packet processor 128. In some embodiments, the CPU 178 is configured to updated various tables and/or databases utilized by the packet processor 128, such as forwarding tables, routing tables, etc. In some embodiments, the CPU 178 is configured to update tables used by the successive path selection engine 136 such as when a path in the communication network is experiencing congestion, a device in the communication network fails, a communication link within the communication network is experiencing congestion, a communication link within the communication network fails, etc., as will be described in more detail below.

Figure 2A:
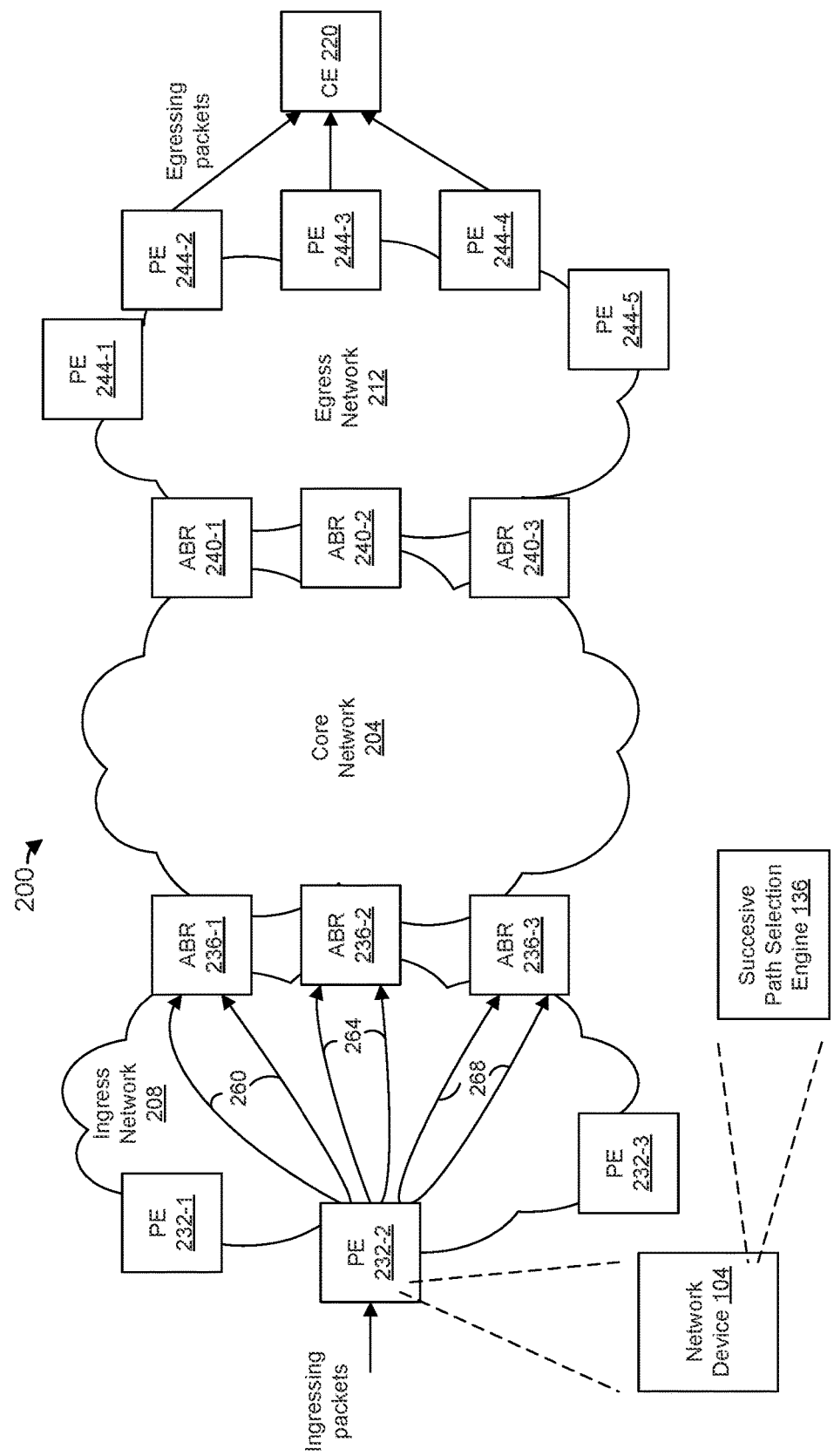
FIG. 2A is a diagram of the network device of FIG. 1 in the context of a hierarchical network, according to an embodiment.

FIG. 2A is a simplified diagram of the network device 104 of FIG. 1 in the context of a hierarchical network 200, according to an embodiment. The hierarchical network 200 includes a core network 204, an ingress network 208, and an egress network 212. The ingress network 208 generally receives packets from one or more first customer networks (not shown) and forwards the packets to the core network 204. The egress network 212 generally receives packets from the core network 204 and forwards the packets to one or more second customer networks (not shown, except for a single customer edge (CE) network device 220 coupled to the egress network 212). In an embodiment, the ingress network 208 also functions as an egress network to forward packets received from the core network 204 to the one or more first customer networks, and the egress network 212 also functions as an ingress network to receive packets from the one or more second customer networks and to forward the packets to the core network 204. For example, the ingress network 208 is a first aggregation network that also functions as an egress network, and the egress network 212 is a second aggregation network that also functions as an ingress network, in an embodiment.

The ingress network 208 includes a plurality of PE network devices 232 that are configured to communicatively couple the one or more first customer networks with the ingress network 208. In the example of FIG. 2A, the PE network device 232-2 includes the network device 104. Although three PE network devices 232 are illustrated in FIG. 2A, the ingress network 208 includes other suitable quantities of PE network devices 232 in various embodiments.

The core network 204 includes a plurality of access border router (ABR) network devices 236 that are configured to communicatively couple the core network 204 with the ingress network 208. Although three ABR network devices 236 are illustrated in FIG. 2A, the core network 204 includes other suitable quantities of ABR network devices 236 in various embodiments.

The core network 204 also includes a plurality of access ABR network devices 240 that are configured to communicatively couple the core network 204 with the egress network 212. Although three ABR network devices 240 are illustrated in FIG. 2A, the core network 204 includes other suitable quantities of ABR network devices 240 in various embodiments.

The egress network 212 includes a plurality of PE network devices 244 that are configured to communicatively couple the one or more first customer networks with the ingress network 208. In the example of FIG. 2A, the PE network device 244-2, the PE network device 244-3, and the PE network device 244-4 are communicatively coupled to the CE network device 220. Although five PE network devices 244 are illustrated in FIG. 2A, the egress network 212 includes other suitable quantities of PE network devices 244 in various embodiments.

For packets that are destined for the CE network device 220 and that ingress the hierarchical network 200 via the PE network device 232-2, for example, there are a large number of alternative paths through the hierarchical network 200. For example, the CE network device 220 is coupled to multiple ones of the PE network devices 244, and at least for that reason there are multiple alternative paths through the egress network 212 to the CE network device 220 (e.g., at least different paths via the different PE network devices 244 coupled to the CE network device 220). Similarly, there are multiple ABR network devices 240 that couple the core network 204 with the egress network 212, and at least for that reason there are multiple alternative paths through the core network 204 to the egress network 212 (e.g., at least different paths via the different ABR network devices 240). Similarly, there are multiple ABR network devices 236 that couple the core network 204 with the ingress network 208, and at least for that reason there are multiple alternative paths through the ingress network 208 to the core network 204 (e.g., at least different paths via the different ABR network devices 236). Additionally, there are multiple paths 260, 264, 268 within the ingress network 208 to each of the ABRs 236. Although two paths for each ABR 236 are illustrated in FIG. 2A, the ingress network 208 includes other suitable quantities of alternative paths to each ABR 236, in various embodiments.

The core network 204, the ingress network 208, and the egress network 212 correspond to different routing domains, in an embodiment.

In some embodiments, the successive path selection engine 136 is configured to successively make path selection decisions in respective routing domains in the hierarchical network 200 for packets that ingress the hierarchical network 200 via the PE network device 232-2. As an illustrative example in which an ingressing packet is destined for the CE network device 220, the successive path selection engine 136 is configured to select one of the PE network devices 244-2, 244-3, 244-4 in the egress network 212 for forwarding the packet to the CE network device 220.

Figure 2B:
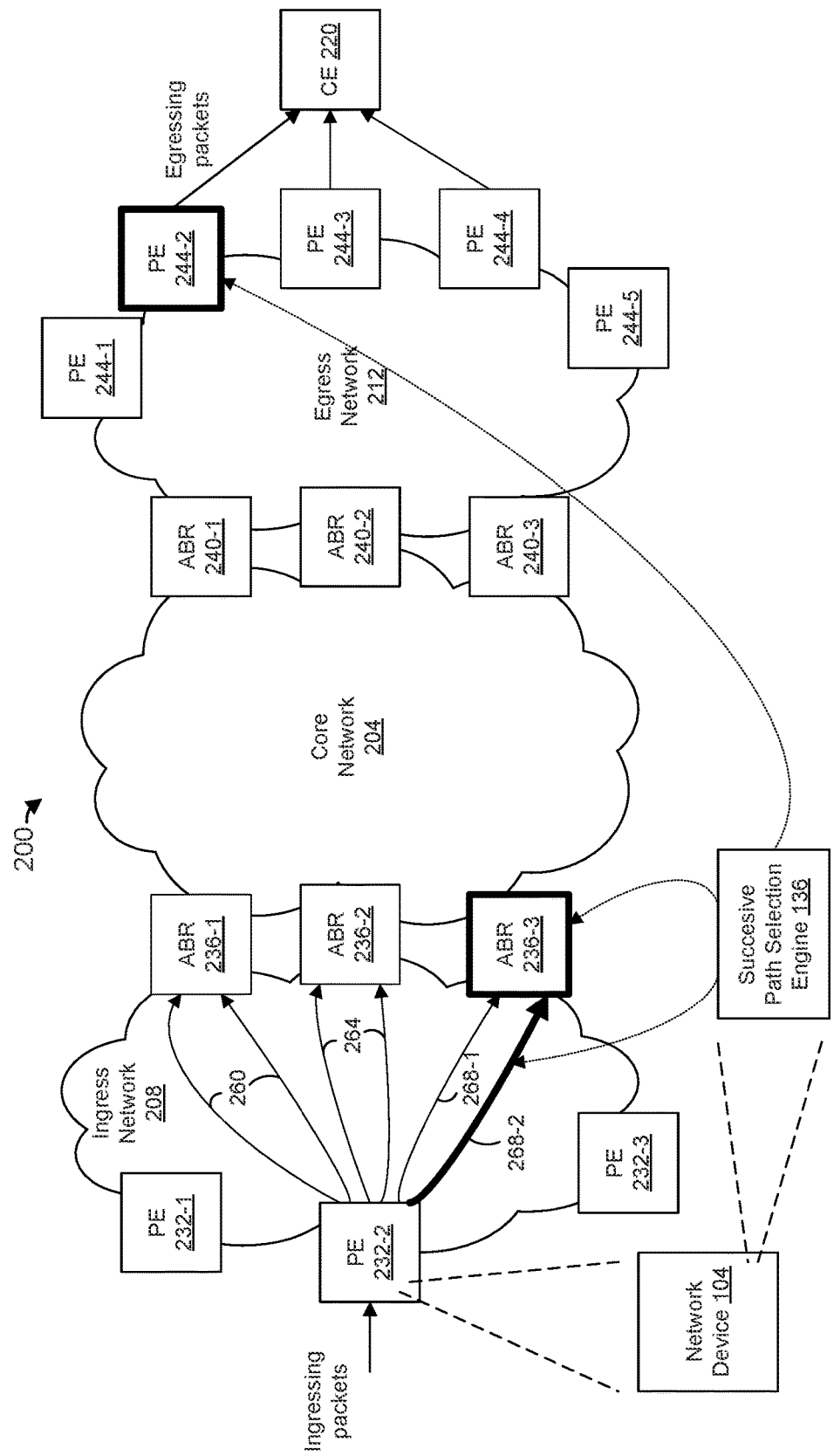
FIG. 2B is a diagram of the hierarchical network of FIG. 2A showing path selection decisions made by the successive path selection engine of FIG. 1, according to an embodiment.

FIG. 2B illustrates the path selection decisions in the hierarchical network 200 of FIG. 2A which have been made for a packet by the successive path selection engine 136, according to an embodiment. For example, in a first path selection decision corresponding to the egress network 212, the successive path selection engine 136 has selected the PE network device 244-2 from among PE network devices 244 that are coupled to the CE network device 220, i.e., from among the PE network devices 244-2, 244-3, 244-4. In connection with the first path selection decision, the network device 104 adds a first tunnel header to the packet (e.g., the header modification engine 140 adds the first tunnel header to the packet), in an embodiment.

In an embodiment, the first path selection decision (i.e., the selecting of the PE network device 244-2) constrains path selection decisions corresponding to the core network 204. For example, the first path selection decision (i.e., the selecting of the PE network device 244-2) limits path selection decisions that can be made with regard to the core network 204 to a subset of all possible path selection options with regard to the core network 204. Thus, in a second path selection decision corresponding to the core network 204, the successive path selection engine 136 has selected the ABR network device 236-3 from among ABR network devices 236 that are configured to route packets via the PE 244-2 selected in the first path selection decision. In connection with the second path selection decision, the network device 104 adds a second tunnel header to the packet (e.g., the header modification engine 140 adds the second tunnel header to the packet), in an embodiment.

In an embodiment, the second path selection decision (i.e., the selecting of the ABR network device 236-3) constrains path selection decisions corresponding to the ingress network 208. For example, the second path selection decision (i.e., the selecting of the ABR network device 236-3) limits path selection decisions that can be made with regard to the ingress network 212 to a subset of all possible path selection options with regard to the ingress network 212. For example, the second path selection decision limits paths available in the ingress network 208 for selection to the paths 268. Thus, in a third path selection decision corresponding to the ingress network 208, the successive path selection engine 136 has selected the path 268-2 from among the paths 268 between the PE network device 232-2 and the ABR network device 236-3. In connection with the third path selection decision, the network device 104 adds a third tunnel header to the packet (e.g., the header modification engine 140 adds the third tunnel header to the packet), in an embodiment.

Figure 3:
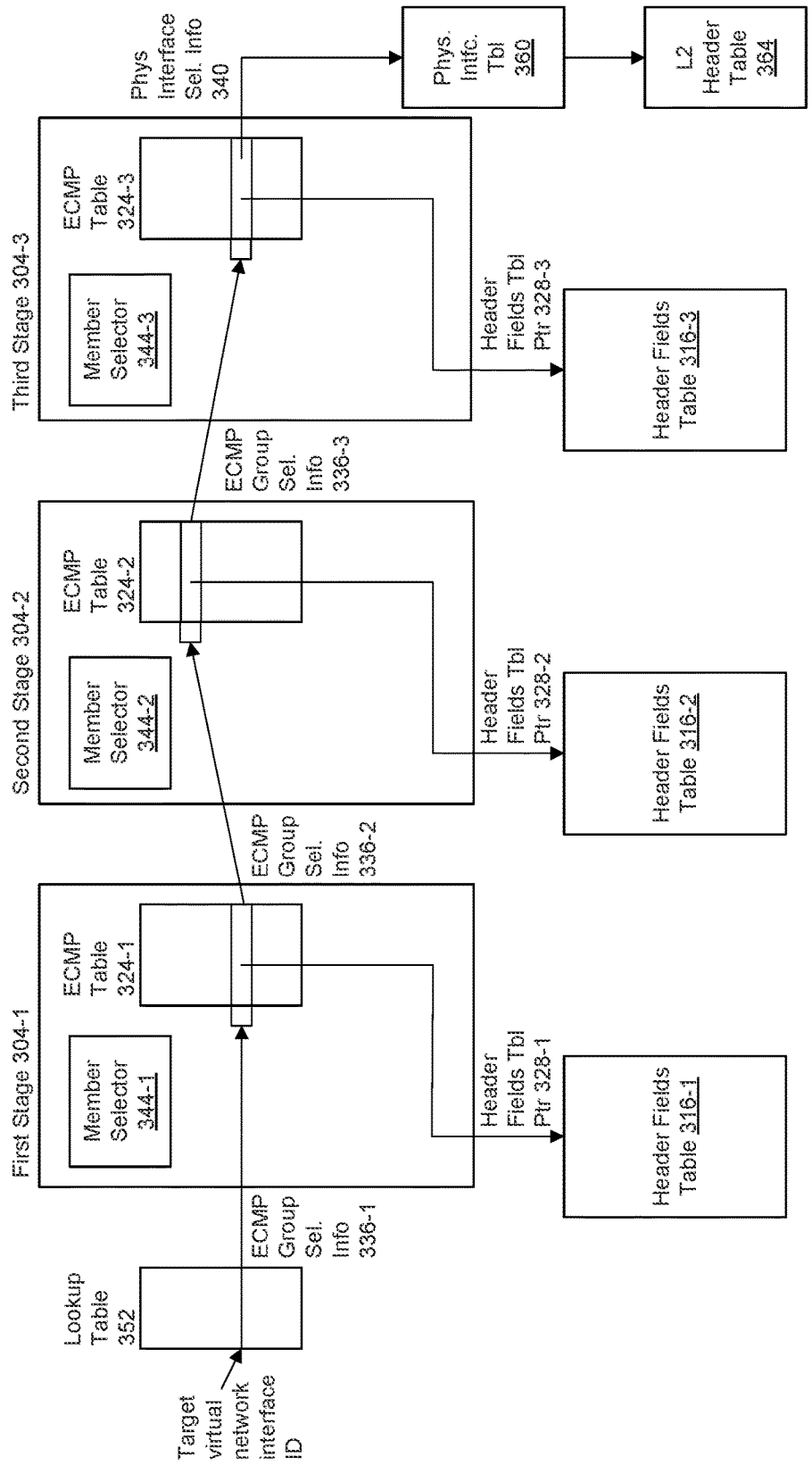
FIG. 3 is a simplified diagram of an example successive path selection engine, according to an embodiment.

FIG. 3 is a simplified diagram of an example successive path selection engine 300 that is configured to successively make path selection decisions for a packet through a communication network, according to an embodiment. The successive path selection engine 300 is an example of the successive path selection engine 136 discussed above with reference to FIGS. 1, 2A, and 2B. In other embodiments, the successive path selection engine 136 of FIGS. 1, 2A, and 2B has a suitable structure different than the successive path selection engine 300 of FIG. 3. Additionally, the successive path selection engine 300 is used in suitable network devices and/or communication networks different than the network device 104 of FIG. 1 and/or the communication network 200 of FIGS. 2A-B, according to some embodiments.

The successive path selection engine 300 includes a plurality of stages 304, where each stage 304 is configured to make a respective path selection decision for a packet corresponding to a respective section of the communication network. In some embodiments, each stage 304 is configured to make a respective path selection decision corresponding to a respective routing domain of a hierarchical network, as will be described in more detail below.

Although three stages 304 are illustrated in FIG. 3, other suitable quantities of stages 304 are utilized in other embodiments, such as two or more than three.

The stages 304 are arranged in series, wherein each stage other than a first-occurring stage in the series (e.g., the first stage 304-1) receives an output from a previous stage in the series and uses the output from the previous stage in the series to make a path selection decision. Also, each stage other than a last-occurring stage in the series (e.g., the third stage 304-3) generates an output that is provided to a subsequent stage in the series for use by the subsequent stage in making a path selection decision. For example, the first stage 304-1 generates a first output that is used by the second stage 304-2 to make a path selection decision; and the second stage 304-2 generates a second output that is used by the third stage 304-3 to make a path selection decision. Stated another way, the second stage 304-2 uses the first output from the first stage 304-1 to make a path selection decision; and the third stage 304-3 uses the second output from the second stage 304-2 to make a path selection decision.

The successive path selection engine 300 also includes header fields tables 316 that are configured to store header field information to be included in tunnel headers that are to be added to packets by the network device 104. As will be described in more detail below, each stage 304 is configured to generate a header fields table pointer (or index) 320. The stage 304 uses the header fields table pointer 320 to retrieve header field information from the respective header fields table 316, the retrieved header fields information corresponding to a path selection decision made by the stage 304.

The header fields tables 316 are stored in one or more memory devices, such as one or more random-access memories (RAMs), one or more solid state memories (SSDs), etc.

Each stage 304 includes an equal cost multipath (ECMP) table 324. The ECMP table 324 is configured to store ECMP member information for ECMP groups corresponding to a respective section of the communication network. In some embodiments, the ECMP table 324 is configured to store ECMP member information for ECMP groups corresponding to a respective routing domain of a hierarchical network.

For each ECMP table 324, the ECMP member information in the ECMP table 324 is organized in sets that correspond to ECMP groups, where each set includes one or more entries corresponding to one or more members of the ECMP group, according to an embodiment. Each entry includes header selection information for selecting header information from the respective header fields table 316, the header information corresponding to the member of the ECMP group that corresponds to the entry, in an embodiment.

When the stage 304 selects an entry in the ECMP table 324, the stage 304 uses the header selection information from the selected entry to retrieve from the respective header fields table 316 header information corresponding to the ECMP member. In an embodiment, the stage 304 is configured to use the header selection information from the one entry in the ECMP table 324 to generate a header fields table pointer 328 that points to header information within the header fields table 316 that corresponds to the ECMP member. In an embodiment, the header selection information in the ECMP table 324 includes the header fields table pointer 328, and the stage 304 outputs the header fields table pointer 328 that was retrieved from the ECMP table 324.

For each stage 304 that is not the last-occurring stage 304, each entry of the ECMP table 324 also includes next stage ECMP group selection information 336 that is to be used by the next stage 304 for selecting an ECMP group, in an embodiment. The next stage ECMP group selection information 336 constrains the ECMP member selection by the next stage 304. For example, the next stage ECMP group selection information 336 constrains the ECMP member selection by the next stage 304 to one or more ECMP groups, in some embodiments.

For the last-occurring stage 304, each entry also includes physical network interface selection information 340 that is to be used to select a physical network interface corresponding to the member of the ECMP group, in an embodiment.

Each stage 304 is configured to receive ECMP group selection information 336 and to use the ECMP group selection information 336 to determine an ECMP group from which the stage 304 is to select a member.

Each stage 304 also includes a member selector 344 that is configured to select an ECMP member from the determined ECMP group. The member selector 344 is configured to select an ECMP member from the determined ECMP group using any of various suitable ECMP member selection techniques. In some embodiments, the member selector 344 is configured to use header information from the packet (e.g., obtained from the packet descriptor corresponding to the packet) to select the ECMP member from the determined ECMP group. For example, the member selector 344 is configured to generate a hash value using header information from the packet, and to use the hash value to select the ECMP member from the determined ECMP group. In some embodiments, the packet processor 128 (FIG. 1) assigns flow identifiers (IDs) to at least some packets processed by the packet processor 128, and the member selector 344 is configured to use flow ID assigned to the packet (e.g., obtained from the packet descriptor corresponding to the packet) to select the ECMP member from the determined ECMP group. In other embodiments, member selector 344 selects an ECMP member from the determined ECMP group using other suitable techniques.

The successive path selection engine 300 also includes a lookup table 352 that stores associations between virtual network interface identifiers (IDs) and ECMP groups corresponding to the first stage 304-1. The lookup table 352 is used by the successive path selection engine 300 to determine the ECMP group selection information 336-1 that is provided to the first stage 304. Referring briefly to FIG. 1, the forwarding engine 132 determines virtual target network interface IDs for at least some packets that are processed by the packet processor 128. Referring again to FIG. 3, the successive path selection engine 300 uses the virtual target network interface ID for a packet to look up, in the lookup table 352, ECMP group selection information 336-1 for the packet and provides the ECMP group selection information 336-1 to the first stage 304-1, in an embodiment.

The successive path selection engine 300 also includes a physical interface table 360 and a layer-2 (L2) header table 364 that stores L2 header information for L2 headers. The physical interface table 360 stores associations between physical network interfaces 112 (FIG. 1) of the network device 104 and L2 headers that are to be used for packets transmitted from the physical network interfaces 112, in an embodiment. The successive path selection engine 300 uses the physical interface selection information 340 and the physical interface table 360 to look up a pointer to an entry in the L2 header table 364. The successive path selection engine 300 then retrieves L2 header information from the entry in the L2 header table 364. In an embodiment, the physical network interface selection information 340 in the ECMP table 324-3 includes a pointer to the physical interface table 360, and the stage 304-3 outputs the pointer to the physical interface table 360 that was retrieved from the ECMP table 324-3.

Referring now to FIGS. 1 and 3, the header information retrieved from the header fields tables 316 and the L2 header table 364 are provided to the header modification engine 140, which uses the header information to add corresponding headers to the packet.

In operation, the successive path selection engine 300 receives a target virtual network interface ID and uses the target virtual network interface ID to lookup ECMP group selection information 336-1 in the lookup table 352. The first stage 304-1 uses the ECMP group selection information 336-1 to select a group of entries in the ECMP table 324-1 corresponding to an ECMP group, and the member selector 344-1 then selects an entry from the selected group of entries, the selected entry corresponding to a member of the ECMP group.

The selected entry in the ECMP table 324-1 includes header selection information for selecting header information from the header fields table 316-1, and the first stage 304-1 uses the header selection information from the selected entry to retrieve from the respective header fields table 316-1 header information corresponding to the ECMP member. In an embodiment, the first stage 304-1 uses the header selection information from the selected entry in the ECMP table 324-1 to generate the header fields table pointer 328-1 that points to header information within the header fields table 316-1 that corresponds to the ECMP member.

The selected entry in the ECMP table 324-1 also includes next stage ECMP group selection information 336-2 that is to be used by the next stage 304 (e.g., the second stage 304-2) for selecting an ECMP group, in an embodiment. The next stage ECMP group selection information 336-2 constrains the ECMP member selection by the next stage 304. For example, the next stage ECMP group selection information 336-2 constrains the ECMP member selection by the next stage 304 to one or more ECMP groups, in some embodiments.

The second stage 304-2 uses the ECMP group selection information 336-2 to select a group of entries in the ECMP table 324-2 corresponding to an ECMP group, and the member selector 344-2 then selects an entry from the selected group of entries, the selected entry corresponding to a member of the ECMP group.

The selected entry in the ECMP table 324-2 includes header selection information for selecting header information from the header fields table 316-2, and the second stage 304-2 uses the header selection information from the selected entry to retrieve from the respective header fields table 316-2 header information corresponding to the ECMP member. In an embodiment, the second stage 304-2 uses the header selection information from the selected entry in the ECMP table 324-2 to generate the header fields table pointer 328-2 that points to header information within the header fields table 316-2 that corresponds to the ECMP member.

The selected entry in the ECMP table 324-2 also includes next stage ECMP group selection information 336-3 that is to be used by the next stage 304 (e.g., the third stage 304-3) for selecting an ECMP group, in an embodiment. The next stage ECMP group selection information 336-3 constrains the ECMP member selection by the next stage 304. For example, the next stage ECMP group selection information 336-3 constrains the ECMP member selection by the next stage 304 to one or more ECMP groups, in some embodiments.

The third stage 304-3 uses the ECMP group selection information 336-3 to select a group of entries in the ECMP table 324-3 corresponding to an ECMP group, and the member selector 344-3 then selects an entry from the selected group of entries, the selected entry corresponding to a member of the ECMP group.

The selected entry in the ECMP table 324-3 includes header selection information for selecting header information from the header fields table 316-3, and the third stage 304-3 uses the header selection information from the selected entry to retrieve from the respective header fields table 316-3 header information corresponding to the ECMP member. In an embodiment, the third stage 304-3 uses the header selection information from the selected entry in the ECMP table 324-3 to generate the header fields table pointer 328-3 that points to header information within the header fields table 316-3 that corresponds to the ECMP member.

The selected entry in the ECMP table 324-3 also includes physical interface selection information 340. The successive path selection engine 300 uses the physical interface selection information 340 and the physical interface table 360 to look up a pointer to an entry in the L2 header table 364. The successive path selection engine 300 then retrieves L2 header information from the entry in the L2 header table 364.

Referring now to the example hierarchical network 200 of FIGS. 2A-B as merely an illustrative example, the first stage 304-1 selects a pseudowire (PW) connection corresponding to the PE 244-2 based on a virtual target network interface corresponding to the CE 220, and retrieves header information for the selected PW connection from the header fields table 316-1. The header modification engine 140 (FIG. 1) uses the header information retrieved from the header fields table 316-1 to add a service MPLS label to the packet.

The second stage 304-2 selects the ABR 236-3 based on the ECMP group selection information 336-2, which constrains which ABRs 236 can be selected by the second stage 304-2. The second stage 304-2 then retrieves header information for the selected ABR 236-3 from the header fields table 316-2. The header modification engine 140 (FIG. 1) uses the header information retrieved from the header fields table 316-2 to add a tunnelling inner MPLS label to the packet.

The third stage 304-3 selects the path 268-2 based on the ECMP group selection information 336-3, which constrains which paths through the ingress network 208 can be selected by the third stage 304-3. The third stage 304-3 then retrieves header information for the selected path 268-2 from the header fields table 316-3. The header modification engine 140 (FIG. 1) uses the header information retrieved from the header fields table 316-3 to add a tunnelling outer MPLS label to the packet.

Additionally, the successive path selection engine 300 uses the physical interface selection information 340 to identify the physical network interface 112 (FIG. 1) via which the packet is to be transmitted, and selects from the L2 header table 364 L2 header information for an L2 header to be added to the packet. The header modification engine 140 (FIG. 1) then uses the L2 header information retrieved from the L2 header table 364 to add the L2 header to the packet.

In some embodiments, a stage 304 is configured to selectively act in a pass-through mode in which the stage 304 passes through ECMP group selection information 336 and does not retrieve header information from the respective header fields table 316. For example, when the first stage 304-1 is operating in the pass-through mode, the first stage 304-1 passes through the ECMP group selection information 336-1 and outputs the ECMP group selection information 336-1 as the ECMP group selection information 336-2. Operating a stage 304 in the pass-through mode is useful when less than three headers are required for a tunneling a packet through the communication network. As an illustrative example, if a packet will not traverse a section of the communication network that corresponds to the stage 304, the stage 304 is configured to operate in the pass-through mode, according to an embodiment. As another illustrative example, some tunnels through the communication network require fewer tunneling headers than other tunnels, according to an embodiment.

Figure 4:
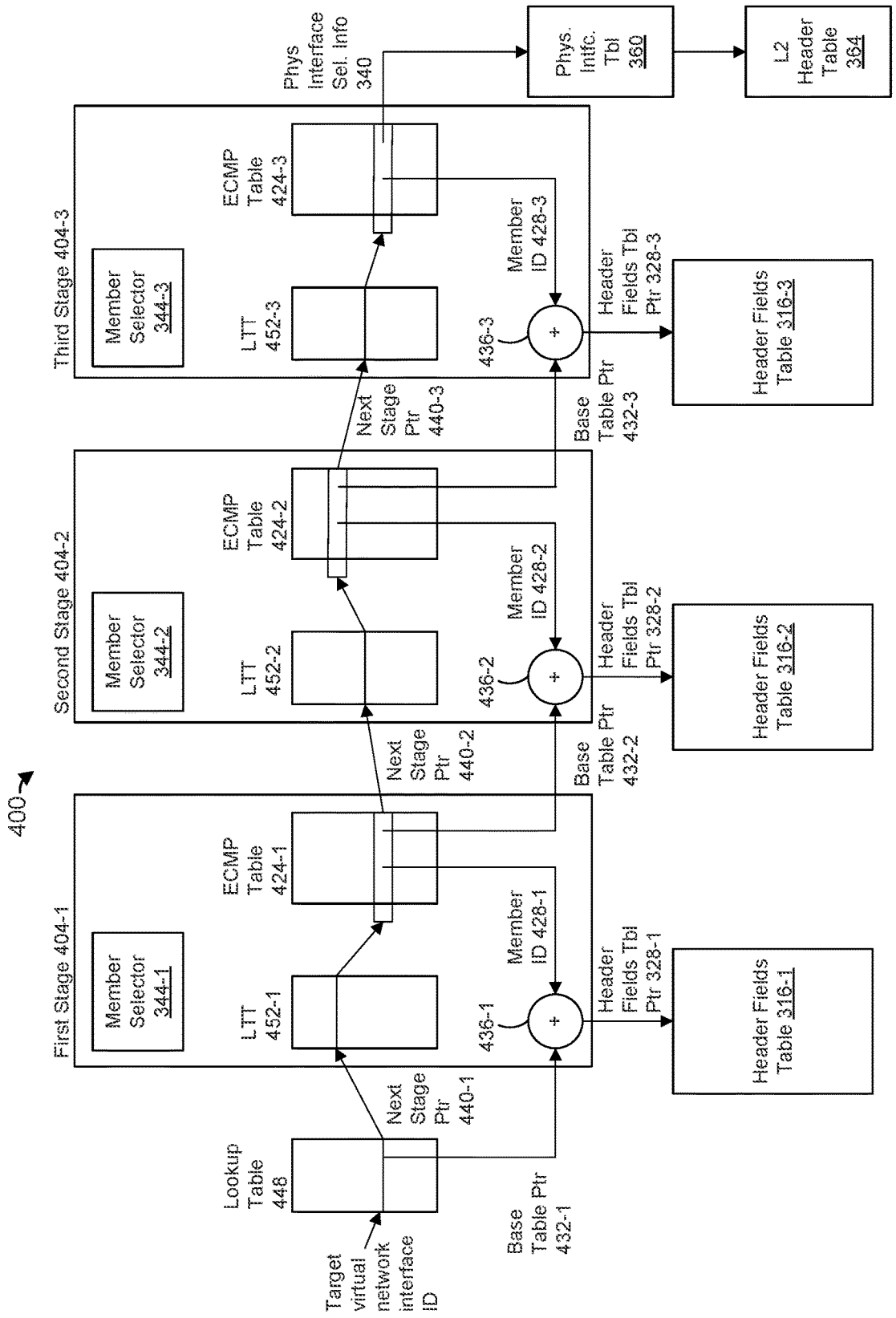
FIG. 4 is a simplified diagram of another example successive path selection engine, according to another embodiment.

FIG. 4 is a simplified diagram of another example successive path selection engine 400 that is configured to successively make path selection decisions for a packet through a communication network, according to another embodiment. The successive path selection engine 400 is an example of the successive path selection engine 136 discussed above with reference to FIGS. 1, 2A, and 2B. In other embodiments, the successive path selection engine 136 of FIGS. 1, 2A, and 2B has a suitable structure different than the successive path selection engine 400 of FIG. 4. Additionally, the successive path selection engine 400 is used in suitable network devices and/or communication networks different than the network device 104 of FIG. 1 and/or the communication network 200 of FIGS. 2A-B, according to some embodiments.

The successive path selection engine 400 has structure similar to the structure of the successive path selection engine 300 of FIG. 3, and like-numbered elements are not described again in detail for purposes of brevity.

Like the successive path selection engine 300 of FIG. 3, the successive path selection engine 400 includes a plurality of stages 404, where each stage 404 is configured to make a respective path selection decision for a packet corresponding to a respective section of the communication network. In some embodiments, each stage 404 is configured to make a respective path selection decision corresponding to a respective routing domain of a hierarchical network, as will be described in more detail below.

Although three stages 404 are illustrated in FIG. 4, other suitable quantities of stages 404 are utilized in other embodiments, such as two or more than three.

The stages 404 are arranged in series, wherein each stage other than a first-occurring stage in the series (e.g., the first stage 404-1) receives an output from a previous stage in the series and uses the output from the previous stage in the series to make a path selection decision. Also, each stage other than a last-occurring stage in the series (e.g., the third stage 404-3) generates an output that is provided to a subsequent stage in the series for use by the subsequent stage in making a path selection decision. For example, the first stage 404-1 generates a first output that is used by the second stage 404-2 to make a path selection decision; and the second stage 404-2 generates a second output that is used by the third stage 404-3 to make a path selection decision. Stated another way, the second stage 404-2 uses the first output from the first stage 404-1 to make a path selection decision; and the third stage 404-3 uses the second output from the second stage 404-2 to make a path selection decision.

Each stage 404 includes an ECMP table 424 that is similar to the ECMP tables 324 described with reference to FIG. 3. The ECMP table 424 is configured to store ECMP member information for ECMP groups corresponding to a respective section of the communication network. In some embodiments, the ECMP table 424 is configured to store ECMP member information for ECMP groups corresponding to a respective routing domain of a hierarchical network.

For each ECMP table 424, the ECMP member information in the ECMP table 424 is organized in sets that correspond to ECMP groups, where each set includes one or more entries corresponding to one or more members of the ECMP group, according to an embodiment. Each entry includes header selection information for selecting header information from the respective header fields table 316, the header information corresponding to the member of the ECMP group that corresponds to the entry, in an embodiment. When the member selector 344 of the stage 404 selects an entry in the ECMP table 424, the stage 404 uses the header selection information from the selected entry to retrieve from the respective header fields table 316 header information corresponding to the ECMP member.

The header selection information includes a member ID 428 that corresponds to the selected member of the ECMP group. The stage 404 includes an adder 436 that adds the member ID 428 to a base table pointer 432 to generate the header fields table pointer 328 discussed above. In some embodiments, the base table pointer 432 acts as a base pointer into the header fields table 316 and the member ID 428 acts as an offset from the base table pointer 432. The base table pointer 432 points to a set of header fields information within the header fields table 316 that corresponds to the selected ECMP group, and the member ID 428 acts as an offset from the base table pointer 432 to select a subset of the header fields information that corresponds to the selected member of the ECMP group, in an embodiment.

In another embodiment, the base table pointer 432 points to a set of header fields information within the header fields table 316 that corresponds to one or more ECMP groups, and the member ID 428 acts as an offset from the base table pointer 432 to select a subset of the header fields information that corresponds to a selected member of a selected ECMP group.

For each stage 404 that is not the last-occurring stage 404, each entry of the ECMP table 424 also includes next stage ECMP group selection information that is to be used by the next stage 404 for selecting an ECMP group, in an embodiment. The next stage ECMP group selection information includes the base table pointer 432 and a next stage pointer 440. As discussed above, the base table pointer 432 points to a set of header fields information within the header fields table 316 that corresponds to one or more ECMP groups, in some embodiments. Thus, the base table pointer 432 constrains the ECMP member selection by the next stage 404. For example, the base table pointer 432 constrains the ECMP member selection by the next stage 404 to one or more ECMP groups, in some embodiments.

The next stage pointer 440 is an indicator of a set of one or more ECMP groups from which the stage 404 receiving the next stage pointer 440 is to select a member. In an embodiment, the next stage pointer 440 is an indicator of a single ECMP group from which the stage 404 receiving the next stage pointer 440 is to select a member. Thus, the next stage pointer 440 constrains the ECMP member selection by the next stage 404. For example, the next stage next stage pointer 440 constrains the ECMP member selection by the next stage 404 to one or more ECMP groups, in some embodiments.

For the last-occurring stage 404, each entry also includes physical network interface selection information 340 that is to be used to select a physical network interface corresponding to the member of the ECMP group, in an embodiment.

Each stage 404 is configured to receive ECMP group selection information (e.g., the base table pointer 432 and the next stage pointer 440) and to use the ECMP group selection information to determine an ECMP group from which the stage 404 is to select a member. Each stage 404 is configured to then select an ECMP member from the determined ECMP group.

The successive path selection engine 400 also includes a lookup table 448 that stores associations between virtual network interface IDs and ECMP groups corresponding to the first stage 404-1. In an embodiment, the lookup table 448 stores associations between virtual network interface IDs and ECMP group selection information (e.g., base table pointers 432-1 and next stage pointers 440-1). The successive path selection engine 400 uses the virtual target network interface ID for a packet to look up, in the lookup table 448, ECMP group selection information (e.g., the base table pointer 432-1 and the next stage pointer 440-1) for the packet and provides the ECMP group selection information to the first stage 404-1, in an embodiment.

The lookup table 448 is used by the successive path selection engine 400 to determine the ECMP group selection information (e.g., the base table pointer 432-1 and the next stage pointer 440-1) that is provided to the first stage 404. Referring briefly to FIG. 1, the forwarding engine 132 determines virtual target network interface IDs for at least some packets that are processed by the packet processor 128. Referring again to FIG. 4, the successive path selection engine 400 uses the virtual target network interface ID for a packet to look up, in the lookup table 448, ECMP group selection information (e.g., the base table pointer 432-1 and the next stage pointer 440-1) for the packet and provides the ECMP group selection information to the first stage 404-1, in an embodiment.

Each stage 404 includes a lookup translation table (LTT) 452 that includes associations between values of the next stage pointer 440 and respective pointers to groups of entries in the ECMP table 424 corresponding to respective sets of one or more ECMP groups. The stage 404 uses the next stage pointer 440 to look up, in the LTT 452, a group of entries in the ECMP table 424 corresponding to respective sets of one or more ECMP groups, in an embodiment. The member selector 344 of the stage 404 then selects an entry from the group of entries in the ECMP table 424.

Use of the LTT 452 permits rearranging of groups of entries in the ECMP table 424 of a stage 404 without having to modify entries in the ECMP table 424 of the previous stage and/or having to modify entries in the lookup table 448, in some embodiments. The lookup table 448 is omitted and entries of the ECMP table 424 of the previous stage and/or entries of the lookup table 448 store pointers to pointers to groups of entries in the ECMP table 424 corresponding to respective sets of one or more ECMP groups, in other embodiments. For example, the next stage pointer 440 points to a group of entries in the ECMP table 424, in some embodiments.

In operation, the successive path selection engine 400 receives a target virtual network interface ID and uses the target virtual network interface ID to lookup ECMP group selection information (e.g., the base table pointer 432-1 and the next stage pointer 440-1) in the lookup table 452. The first stage 404-1 uses the next stage pointer 440-1 to select a group of entries in the ECMP table 424-1 corresponding to an ECMP group, and the member selector 344-1 then selects an entry from the selected group of entries, the selected entry corresponding to a member of the ECMP group.

The selected entry in the ECMP table 424-1 includes the member ID 428-1, and the first stage 404-1 uses the member ID 428-1 and the base table pointer 432-1 to generate the header fields table pointer 328-1. The first stage 404-1 uses the header fields table pointer 328-1 to retrieve from the respective header fields table 316-1 header information corresponding to the ECMP member.

The selected entry in the ECMP table 424-1 also includes next stage ECMP group selection information (e.g., the base table pointer 432-2 and the next stage pointer 440-2) that is to be used by the next stage 404 (e.g., the second stage 404-2) for selecting an ECMP group, in an embodiment. The next stage ECMP group selection information (e.g., the base table pointer 432-2 and the next stage pointer 440-2) constrains the ECMP member selection by the next stage 404. For example, the next stage ECMP group selection information (e.g., the base table pointer 432-2 and the next stage pointer 440-2) constrains the ECMP member selection by the next stage 404 to one or more ECMP groups, in some embodiments.

The second stage 404-2 uses the next stage pointer 440-2 to select a group of entries in the ECMP table 424-2 corresponding to an ECMP group, and the member selector 344-2 then selects an entry from the selected group of entries, the selected entry corresponding to a member of the ECMP group.

The selected entry in the ECMP table 424-2 includes the member ID 428-2, and the second stage 404-2 uses the member ID 428-2 and the base table pointer 432-2 to generate the header fields table pointer 328-2. The second stage 404-2 uses the header fields table pointer 328-2 to retrieve from the respective header fields table 316-2 header information corresponding to the ECMP member.

The selected entry in the ECMP table 424-2 also includes next stage ECMP group selection information (e.g., the base table pointer 432-3 and the next stage pointer 440-3) that is to be used by the next stage 404 (e.g., the third stage 404-3) for selecting an ECMP group, in an embodiment. The next stage ECMP group selection information (e.g., the base table pointer 432-3 and the next stage pointer 440-3) constrains the ECMP member selection by the next stage 404. For example, the next stage ECMP group selection information (e.g., the base table pointer 432-3 and the next stage pointer 440-3) constrains the ECMP member selection by the next stage 404 to one or more ECMP groups, in some embodiments.

The third stage 404-3 uses the next stage pointer 440-3 to select a group of entries in the ECMP table 424-3 corresponding to an ECMP group, and the member selector 344-3 then selects an entry from the selected group of entries, the selected entry corresponding to a member of the ECMP group.

The selected entry in the ECMP table 424-3 includes the member ID 428-3, and the third stage 404-3 uses the member ID 428-3 and the base table pointer 432-3 to generate the header fields table pointer 328-3. The third stage 404-3 uses the header fields table pointer 328-3 to retrieve from the respective header fields table 316-3 header information corresponding to the ECMP member.

The selected entry in the ECMP table 424-3 also includes the physical interface selection information 340 discussed above. The successive path selection engine 400 uses the physical interface selection information 340 and the physical interface table 360 to look up a pointer to an entry in the L2 header table 364. The successive path selection engine 400 then retrieves L2 header information from the entry in the L2 header table 364.

Referring now to the example hierarchical network 200 of FIGS. 2A-B as merely an illustrative example, the first stage 404-1 selects a pseudowire (PW) connection corresponding to the PE 244-2 based on a virtual target network interface corresponding to the CE 220, and retrieves header information for the selected PW connection from the header fields table 316-1. The header modification engine 140 (FIG. 1) uses the header information retrieved from the header fields table 316-1 to add a service MPLS label to the packet.

The second stage 404-2 selects the ABR 236-3 based on the next stage pointer 440-2, which constrains which ABRs 236 can be selected by the second stage 404-2. The second stage 404-2 then retrieves header information for the selected ABR 236-3 from the header fields table 316-2. The header modification engine 140 (FIG. 1) uses the header information retrieved from the header fields table 316-2 to add a tunnelling inner MPLS label to the packet.

The third stage 404-3 selects the path 268-2 based on the next stage pointer 440-3, which constrains which paths through the ingress network 208 can be selected by the third stage 404-3. The third stage 404-3 then retrieves header information for the selected path 268-2 from the header fields table 316-3. The header modification engine 140 (FIG. 1) uses the header information retrieved from the header fields table 316-3 to add a tunnelling outer MPLS label to the packet.

Additionally, the successive path selection engine 400 uses the physical interface selection information 340 to identify the physical network interface 112 (FIG. 1) via which the packet is to be transmitted, and selects from the L2 header table 364 L2 header information for an L2 header to be added to the packet. The header modification engine 140 (FIG. 1) then uses the L2 header information retrieved from the L2 header table 364 to add the L2 header to the packet.

As another illustrative example, the first stage 404-1 selects a virtual private network (VPN) connection corresponding to the PE 244-2 based on a virtual target network interface corresponding to the CE 220, and retrieves header information for the selected VPN connection from the header fields table 316-1. The header modification engine 140 (FIG. 1) uses the header information retrieved from the header fields table 316-1 to add a VPN MPLS label to the packet.

The second stage 404-2 selects the ABR 236-3 based on the next stage pointer 440-2, which constrains which ABRs 236 can be selected by the second stage 404-2. The second stage 404-2 then retrieves header information for the selected ABR 236-3 from the header fields table 316-2. The header modification engine 140 (FIG. 1) uses the header information retrieved from the header fields table 316-2 to add a Border Gateway Protocol Labeled Unicast (BGP-LU) MPLS label to the packet.

The third stage 404-3 selects the path 268-2 based on the next stage pointer 440-3, which constrains which paths through the ingress network 208 can be selected by the third stage 404-3. The third stage 404-3 then retrieves header information for the selected path 268-2 from the header fields table 316-3. The header modification engine 140 (FIG. 1) uses the header information retrieved from the header fields table 316-3 to add a tunnel start MPLS label to the packet.

In some embodiments, a stage 404 is configured to selectively act in a pass-through mode in which the stage 404 passes through ECMP group selection information (e.g., the header fields table pointer 432 and the next stage pointer 440) and does not retrieve header information from the respective header fields table 316. For example, when the first stage 404-1 is operating in the pass-through mode, the first stage 404-1 passes through the header fields table pointer 432-1 and the next stage pointer 440-1, i.e., the first stage 404-1 sets the header fields table pointer 432-2 to the header fields table pointer 432-1, and sets the next stage pointer 440-2 to the next stage pointer 440-1. Operating a stage 404 in the pass-through mode is useful when less than three headers are required for a tunneling a packet through the communication network. As an illustrative example, if a packet will not traverse a section of the communication network that corresponds to the stage 404, the stage 404 is configured to operate in the pass-through mode, according to an embodiment. As another illustrative example, some tunnels through the communication network require fewer tunneling headers than other tunnels, according to an embodiment.

Figure 5A:
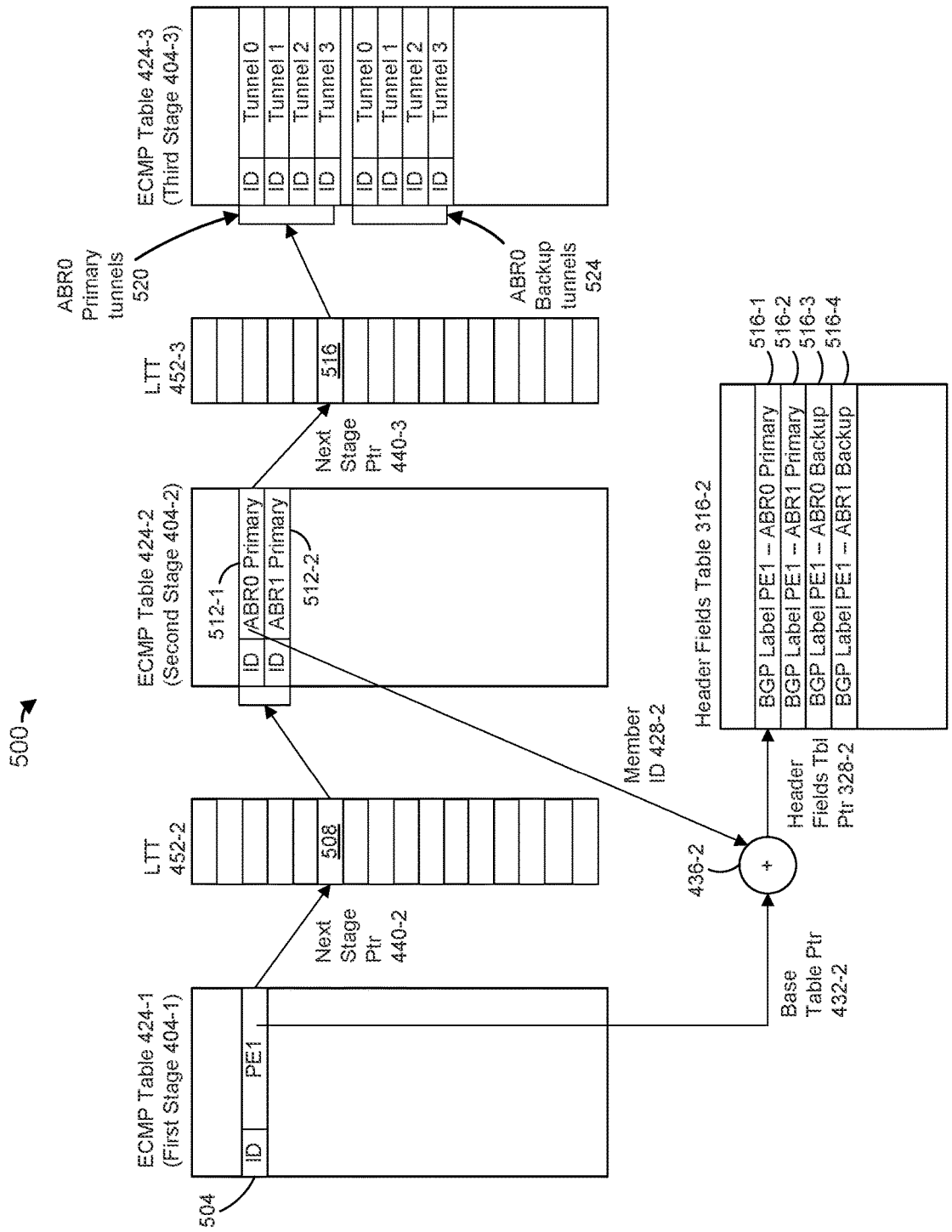
FIGS. 5A-B are diagrams illustrating an example of path re-routing performed by the successive path selection engine of FIG. 4, according to an embodiment.
Figure 5B:
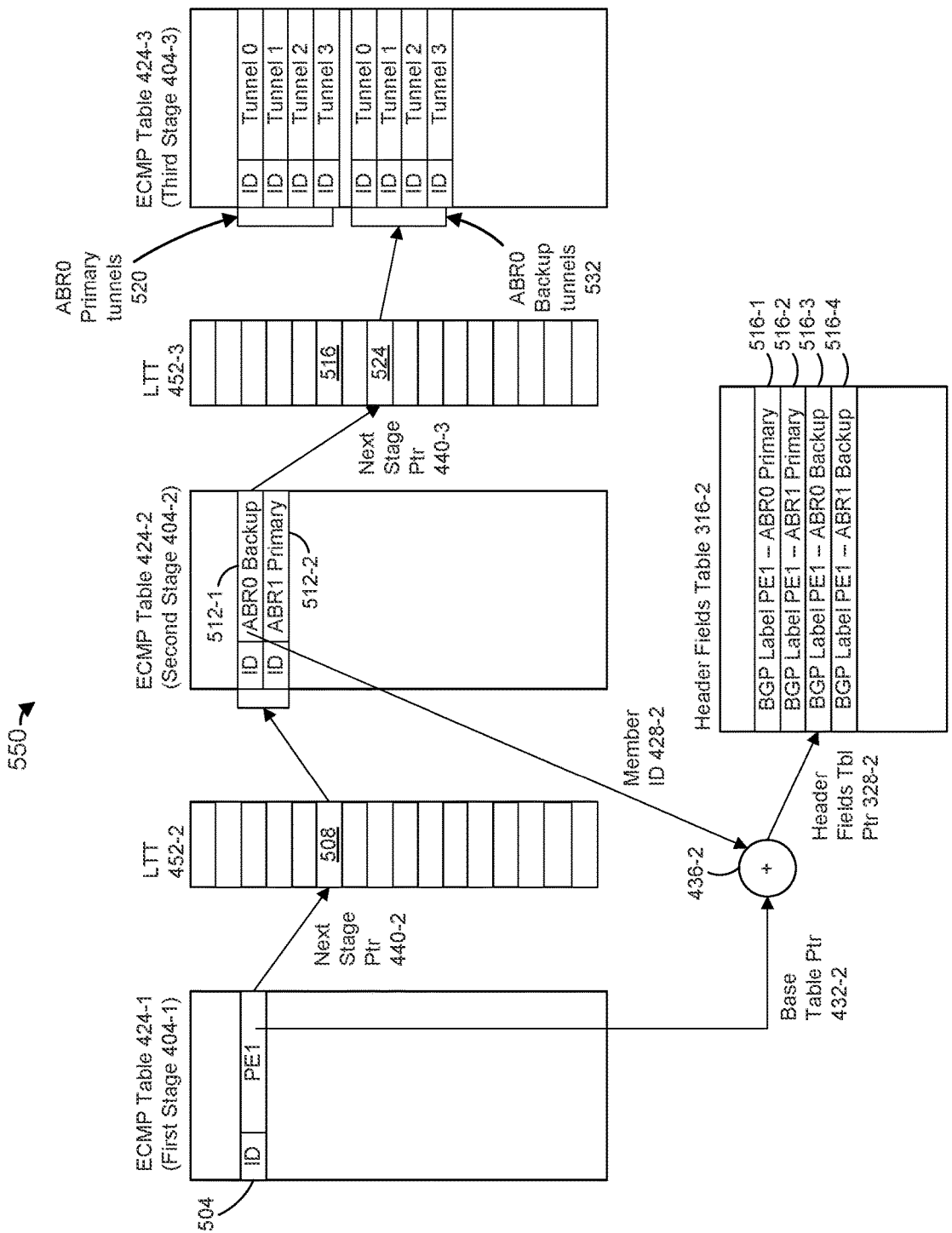

A successive path selection engine such as described above enables fast re-routing in response to a device failure, device congestion, path congestion, etc., at least in some embodiments. FIGS. 5A-B are diagrams illustrating an example of path re-routing performed by the successive path selection engine of FIG. 4, according to an embodiment.

Referring now to FIG. 5A, the first stage 404-1 has selected a particular PE in a hierarchical network corresponding to an entry 504 in the ECMP table 424-1, and has output the base table pointer 432-2 and the next stage pointer 440-2 using information retrieved from the entry 504.

The second stage 404-2 retrieves a pointer 508 from the LTT 452-2 using the next stage pointer 440-2 from the first stage 404-1. The pointer 508 from the LTT 452-2 points to a set of entries 512 in the ECMP table 424-2. The second stage 404-2 has selected the entry 512-1 (corresponding to "ABRO primary") from among the set of entries 512, and has output the member ID 428-2 and the next stage pointer 440-3 using information retrieved from the entry 512-1. The second stage 404-2 also generated the header fields table pointer 328-2 using the member ID 428-2 and the base table pointer 432-2. The header fields table pointer 328-2 points to an entry 516-1 in the header fields table 316-2, which includes header information for a BGP MPLS label corresponding to ABRO Primary.

The third stage 404-3 retrieves a pointer 516 from the LTT 452-3 using the next stage pointer 440-3 from the second stage 404-2. The pointer 516 from the LTT 452-3 points to a set of entries 520 in the ECMP table 424-3. The set of entries 520 corresponds to a set of alternative tunnels to the ABRO Primary selected by the second stage 404-2.

Referring now to FIG. 5B, the entry 512-1 in the ECMP table 424-2 has been overwritten to include information corresponding to a different ABR device, i.e., ABRO Backup. For example, a device failure, device congestion, path congestion, etc., corresponding to ABRO Primary has been detected and the CPU 178 (FIG. 1), for example, has therefore overwritten the entry 512-1 in the ECMP table 424-2 as discussed above. As a result of new information in the entry 512-1, the member ID 428-2 generated by the second stage 404-2 has a new value, which causes the header fields table pointer 328-2 to point to the entry 516-3, which includes header information for a BGP MPLS label corresponding to ABRO Backup.

Also as a result of new information in the entry 512-1, the next stage pointer 440-3 has a new value, which now points to different entry in the LTT 452-3, i.e., an entry 524. The third stage 404-3 retrieves a pointer from the entry 524 in the LTT 452-3 using the next stage pointer 440-3 from the second stage 404-2. The pointer 524 from the LTT 452-3 points to a set of entries 532 in the ECMP table 424-3. The set of entries 532 corresponds to a set of alternative tunnels to the ABRO Backup selected by the second stage 404-2.

As discussed above with reference to FIGS. 3 and 4, a stage 304/404 is configured to selectively act in a pass-through mode in which the stage 304/404 passes through ECMP group selection information and does not retrieve header information from the respective header fields table 316, in some embodiments. Operating a stage 304/404 in the pass-through mode is useful, for example, when a quantity of headers required for a tunneling a packet through the communication network is less than the number of stages 304/404 in the successive path selection engine 300/400.

Figure 6:
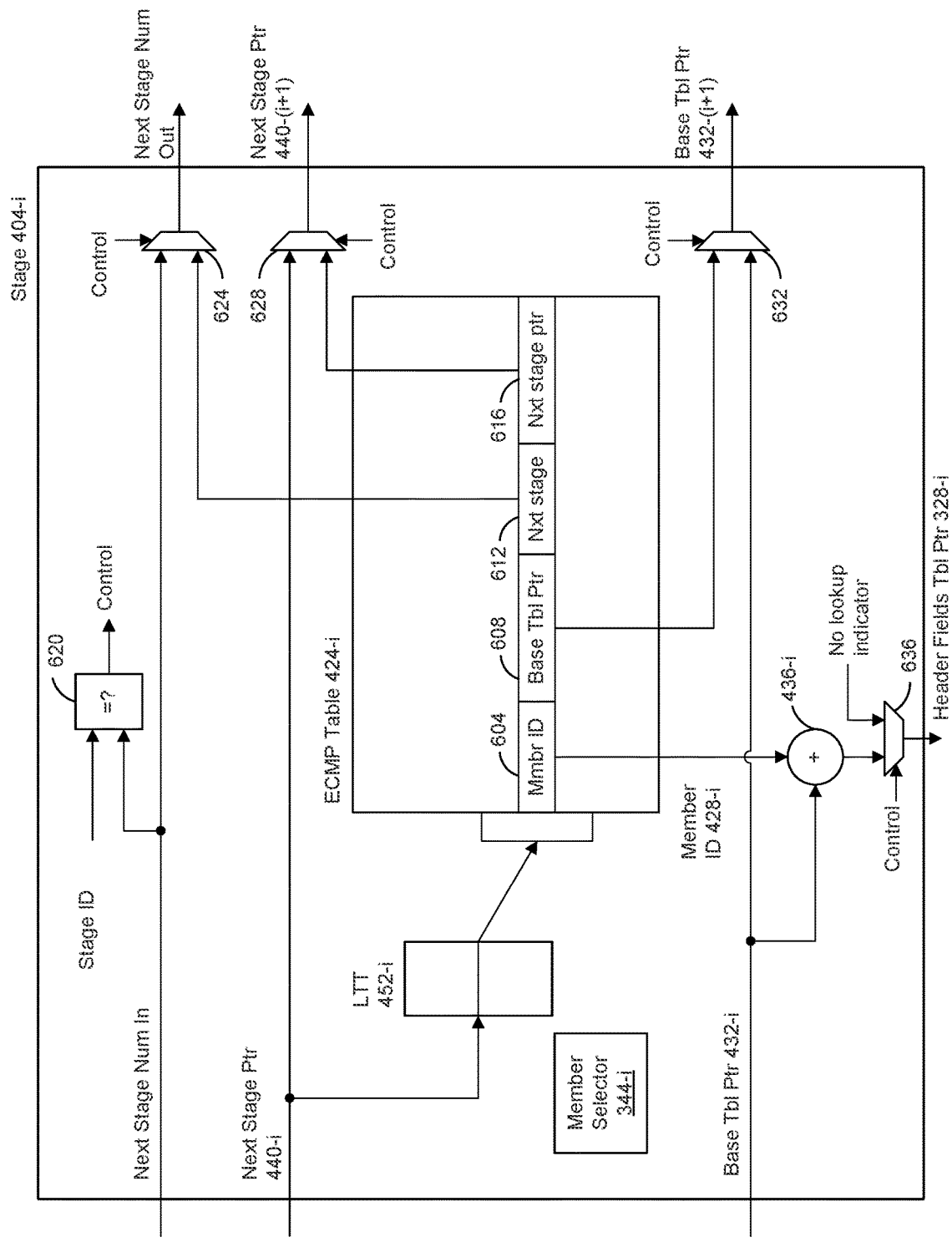
FIG. 6 is a diagram of example stage of the successive path selection engine 400 of FIG. 4, according to an embodiment.

FIG. 6 is a simplified block diagram of an example stage 404-i (like the stages 404 of FIG. 4) that is configured to selectively act in a pass-through mode in which the stage 404-i passes through ECMP group selection information and does not retrieve header information from the respective header fields table 316, in some embodiments. In other embodiments, the stages 404 of FIG. 4 have a suitable structure different than the stage 404-i of FIG. 6. For example, in some embodiments the stages 404 of FIG. 4 are not configured to selectively act in the pass-through mode.

The stage 404-i receives: a next stage number input (Next Stage Num In), a base table pointer 432-i, and a next stage pointer 440-i. Additionally, the stage 404-i outputs: a header fields table pointer 328-$i$, a next stage number output (Next Stage Num Out), a base table pointer 432-($i$+1), and a next stage pointer 440-($i$+1).

Each of at least some entries in the ECMP table 424 includes a member ID field 604, a base table pointer field 608, a next stage field 612, and a next stage pointer field 616. The member ID field 604 stores a member ID value that is to be used by the stage 404-$i$ to calculate the header fields table pointer 328-$i$ when the stage 404-$i$ is not acting in the pass-through mode. For example, the adder 436-$i$ adds the member ID value to the base table pointer 432-$i$ received from the previous stage 404-($i$−1) (or from the lookup table 448 if the stage 404-$i$ is the first-occurring stage) to generate the header fields table pointer 328-$i$.

The base table pointer field 608 stores a base table pointer value that is to be output by the stage 404-$i$ as the base table pointer 432-($i$+1) when the stage 404-$i$ is not acting in the pass-through mode.

The next stage field 612 stores a next stage ID that indicates an identifier of a next stage 404 that is to use outputs of the stage 404-$i$ (e.g., the base table pointer 432-($i$+1) and the next stage pointer 440-($i$+1)). The stage 404-$i$ outputs the value of the next stage field 612 as the next stage pointer 440-($i$+1) when the stage 404-$i$ is not acting in the pass-through mode.

The next stage pointer field 616 stores a next stage pointer value that is to be output by the stage 404-$i$ as the Next Stage Num Out when the stage 404-$i$ is not acting in the pass-through mode. As will be discussed below, when a next-occurring stage (i.e., 404-($i$+1)) receives the Next Stage Num output by the stage 404-$i$, the next-occurring stage 404-($i$+1) compares the value of the received Next Stage Num to an ID of the next-occurring stage 404-($i$+1). If the received Next Stage Num is different than the ID of the next-occurring stage 404-($i$+1), the next-occurring stage 404-($i$+1) operates in the pass-through mode.

The stage 404-$i$ includes a comparator 620 that receives the Next Stage Num In and an ID ("Stage ID") of the stage 404-$i$. The comparator 620 generates a control signal that indicates whether the Next Stage Num In matches the ID of the stage 404-$i$. The control signal controls whether the stage 404-$i$ operates in the pass-through mode, as will be described below.

The stage 404-$i$ includes multiplexers 624, 628, 632, and 636. The multiplexer 624 receives as selectable inputs: the Next Stage Num In and a value stored in the next stage field 612 of a selected entry in the ECMP table 424-$i$ (e.g., selected by the member selector 344-$i$). The multiplexer 624 generates the output Next Stage Num Out based on the control signal generated by the comparator 620. In operation, the multiplexer 624 outputs the value stored in the next stage field 612 when the control signal indicates the Next Stage Num In matches the ID of the stage 404-$i$, and outputs the value of Next Stage Num In when the control signal indicates the Next Stage Num In does not match the ID of the stage 404-$i$.

The multiplexer 628 receives as selectable inputs: the next stage pointer 440-$i$ and a value stored in the next stage pointer field 616 of the selected entry in the ECMP table 424-$i$. The multiplexer 628 generates the output next stage pointer 440-($i$+1) based on the control signal generated by the comparator 620. In operation, the multiplexer 628 outputs the value stored in the next stage pointer field 616 when the control signal indicates the Next Stage Num In matches the ID of the stage 404-$i$, and outputs the value of next stage pointer 440-$i$ when the control signal indicates the Next Stage Num In does not match the ID of the stage 404-$i$.

The multiplexer 632 receives as selectable inputs: the base table pointer 432-$i$ and a value stored in the base table pointer field 608 of the selected entry in the ECMP table 424-$i$. The multiplexer 632 generates the output base table pointer 432-($i$+1) based on the control signal generated by the comparator 620. In operation, the multiplexer 632 outputs the value stored in the base table pointer field 608 when the control signal indicates the Next Stage Num In matches the ID of the stage 404-$i$, and outputs the value of base table pointer 432-$i$ when the control signal indicates the Next Stage Num In does not match the ID of the stage 404-$i$.

The multiplexer 636 receives as selectable inputs: the output of the adder 436-$i$ and a predetermined value that indicates no lookup in the header fields table 316-$i$ is to be performed (or that a lookup in the header fields table 316-$i$ is to be ignored, in some embodiments). The multiplexer 636 generates the output base header fields table 328-$i$ based on the control signal generated by the comparator 620. In operation, the multiplexer 636 outputs the value generated by the adder 436-$i$ when the control signal indicates the Next Stage Num In matches the ID of the stage 404-$i$, and outputs the predetermined value when the control signal indicates the Next Stage Num In does not match the ID of the stage 404-$i$.

Although the stages 304/404 of FIGS. 3 and 4 are depicted as separate physical stages, in other embodiments a single physical stage 304/404 is successively used to look up header information in the header fields tables 316 and the L2 header table 364. For example, group selection information are provided as inputs to the single physical stage 304/404 to generate the header fields table pointer 328-1 for the header fields table 316-1 and new group selection information, which is fed back to the single physical stage 304/404 as inputs to generate the header fields table pointer 328-2 for the header fields table 316-2 and new group selection information, and so on.

In other embodiments, the stages 304/404 share common circuitry that is successively used to look up header information in the header fields tables 316 and the L2 header table 364. For example, different ECMP tables 324/424 (and different LTTs 452 in embodiments that utilize LTTs 452) are accessed by the common circuitry depending on the stage that is being implemented by the common circuitry at a given time.

Figure 7:
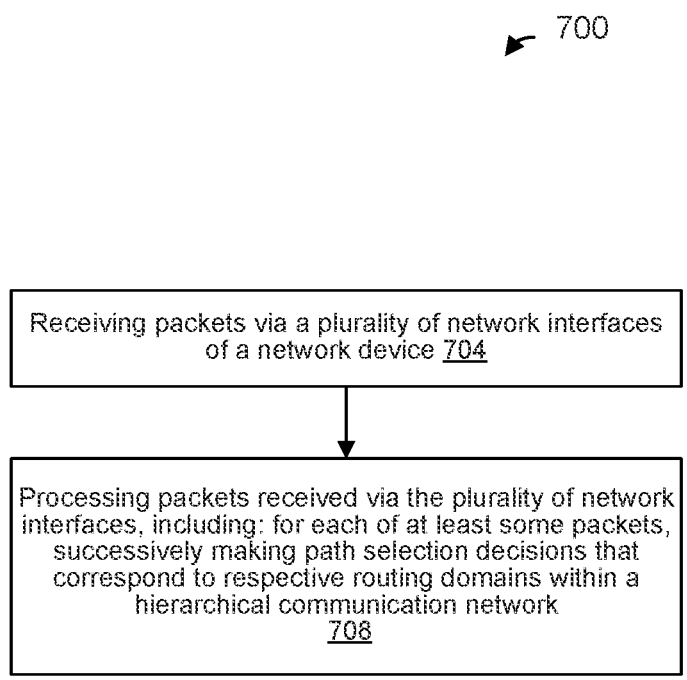
FIG. 7 is a flow diagram of an example method for processing packets in a hierarchical communication network, including successively making path selection decisions that correspond to respective routing domains within the hierarchical communication network, according to an embodiment.

FIG. 7 is a flow diagram of an example method 700 for processing packets in a network device. In some embodiments, the method 700 is implemented by the example network device 104 of FIG. 1. In other embodiments, the method 700 is implemented by a suitable network device different than the network device 104.

In some embodiments, the method 700 is implemented by a network device that includes the example successive path selection engine 300 of FIG. 3. In other embodiments, the method 700 is implemented by a network device that includes the example successive path selection engine 400 of FIG. 4. In other embodiments, the method 700 is implemented by a network device that includes a suitable successive path selection engine that is different than the successive path selection engine 300 and the successive path selection engine 400. The method 700 is described with reference to FIGS. 1, 3, and 4 merely for ease of explanation.

At block 704, a network device receives packets via a plurality of network interfaces. In an embodiment, the plurality of network interfaces are coupled to a plurality of physical network links. For example, the network device 104 receives packets via the network interfaces 112.

At block 708, a packet processor of the network device processes packets received via the plurality of network interfaces. For example, the packet processor 128 processes packets that were received via the network interfaces 112. Processing packets at block 708 includes: for each of at least some packets processed by the packet processor, successively making path selection decisions for forwarding the packet through a communication network. In some embodiments, the path selection decisions correspond to respective routing domains within a hierarchical communication network, and the path selection decisions are for forwarding the packet through the hierarchical communication network. For example, the successive path selection engine 136/300/400 successively makes path selection decisions that correspond to respective routing domains within a hierarchical communication network.

In some embodiments, successively making path selection decisions at block 708 comprises: making a first path selection decision for a first routing domain within the hierarchical communication network; using the first path selection decision to constrain a second path selection decision for a second routing domain within the hierarchical communication network; and making the second path selection decision based on the constraining of the second path selection decision.

For example, the first stage 304-1/404-1 makes a first path selection decision for a first routing domain within the hierarchical communication network; the first stage 304-1/404-1 uses the first path selection decision to constrain a second path selection decision for a second routing domain within the hierarchical communication network; and the second stage 304-2/404-2 makes the second path selection decision based on the constraining of the second path selection decision. As another example, the second stage 304-2/404-2 makes the second path selection decision for the second routing domain; the second stage 304-2/404-2 uses the second path selection decision to constrain a third path selection decision for a third routing domain within the hierarchical communication network; and the third stage 304-3/404-3 makes the third path selection decision based on the constraining of the third path selection decision.

In some embodiments, successively making path selection decisions at block 708 further comprises: in connection with making the first path selection decision for the first routing domain, retrieving, from a first group selection table, group selection information that is configured to constrain the second path selection decision for the second routing domain. Using the first path selection decision to constrain the second path selection decision comprises using the group selection information retrieved from the first group selection table to constrain the making of the second path selection decision for the second routing domain, in an embodiment.

For example, the first stage 304-1/404-1 retrieves from the ECMP table 324-1/424-1 group selection information (e.g., the ECMP group selection information 336-2, the base table pointer 432-2, the next stage pointer 440-2, etc.); and the second stage 304-2/404-2 uses the group selection information (e.g., the ECMP group selection information 336-2, the base table pointer 432-2, the next stage pointer 440-2, etc.) to constrain the making of the second path selection decision for the second routing domain.

As another example, the second stage 304-2/404-2 retrieves from the ECMP table 324-2/424-2 group selection information (e.g., the ECMP group selection information 336-3, the base table pointer 432-3, the next stage pointer 440-3, etc.); and the third stage 304-3/404-3 uses the group selection information (e.g., the ECMP group selection information 336-3, the base table pointer 432-3, the next stage pointer 440-3, etc.) to constrain the making of the third path selection decision for the second routing domain.

In some embodiments, using the group selection information retrieved from the first group selection table to constrain the making of the second path selection decision for the second routing domain comprises: using the group selection information retrieved from the first group selection table to select a set of entries in a second group selection table in connection with making the second path selection decision. Making the second path selection decision comprises selecting one entry in the second group selection table from the set of entries in the second group selection table, in an embodiment.

For example, the second stage 304-2/404-2 uses the group selection information (e.g., the ECMP group selection information 336-2, the base table pointer 432-2, the next stage pointer 440-2, etc.) select a set of entries in the ECMP table 324-2/424-2; and the member selector 344-2 selects one entry from the set of entries in the ECMP table 324-2/424-2.

In some embodiments, the method 700 further comprises: determining, by the network device, to re-route one or more paths through the first routing domain; and in response to determining to re-route the one or more paths through the first routing domain, overwriting, by the network device, one or more entries in a first group selection table corresponding to the first routing domain, including overwriting group selection information in the one or more entries that is configured to constrain subsequent path selections made by the packet processor.

For example, the CPU 178 determines to re-route one or more paths through the first routing domain; and in response to determining to re-route the one or more paths through the first routing domain, the CPU overwrites one or more entries in the ECMP table 324-1/424-1 corresponding to the first routing domain. As another example, the CPU 178 determines to re-route one or more paths through the second routing domain; and in response to determining to re-route the one or more paths through the second routing domain, the CPU overwrites one or more entries in the ECMP table 324-2/424-2 corresponding to the second routing domain.

In some embodiments, the method 700 further comprises: for each path selection decision: determining a respective index into a respective header information table of the network device, and using the respective index to retrieve respective header information from the header information table; and for each of at least some packets, using header information retrieved from the header information tables to add one or more headers to the packet.

For example, the stages 304/404 determine the header fields table pointers 328 and uses the header fields table pointers 328 to retrieve respective header information from the header information tables 316; and the header modification engine 140 using header information retrieved from the header information tables 316 to add one or more headers to the packet.

In some embodiments, successively making path selection decisions at block 708 comprises: making a first path selection decision for a first routing domain within the hierarchical communication network; and using the first path selection decision to generate a base pointer for a header information table corresponding to a second routing domain within the hierarchical communication network; and the method further comprises: in connection with making a second path selection decision corresponding to the second routing domain: determining an index into the header information table corresponding to the second routing domain, and using the base pointer and the index into the header information table corresponding to the second routing domain to retrieve respective header information from the header information table corresponding to the second routing domain.

For example, the stage 404-1 makes a first path selection decision for a first routing domain within the hierarchical communication network, and uses the first path selection decision to generate the base table pointer 432-2. The stage 404-2 generate the member ID 428-2, and uses the base table pointer 432-2 and the member ID 428-2 to retrieve respective header information from the header information table 316-2.

As another example, the stage 404-2 makes the second path selection decision for the second routing domain within the hierarchical communication network, and uses the second path selection decision to generate the base table pointer 432-3. The stage 404-3 generate the member ID 428-3, and uses the base table pointer 432-3 and the member ID 428-3 to retrieve respective header information from the header information table 316-3.

In some embodiments, successively making path selection decisions at block 708 comprises: using a plurality of hardware circuitry stages of the packet processor to, for each of at least some packets processed by the packet processor, make a respective path selection decision that correspond to a respective routing domain within the hierarchical communication network. For example, the plurality of stages 304/404 are coupled in series to successively making path selection decisions.

In some embodiments, successively making path selection decisions at block 708 comprises: using shared circuitry of the packet processor to successively make path selection decisions that correspond to respective routing domains within a hierarchical communication network.

In some embodiments, successively making path selection decisions comprises: successively making equal cost multipath (ECMP) path selection decisions that correspond to respective routing domains within the hierarchical communication network.

Embodiment 1: A network device, comprising: a plurality of network interfaces configured to couple with a plurality of physical network links; and a packet processor configured to process packets received via the plurality of network interfaces, the packet processor including a path selection engine that is configured to: for each of at least some packets processed by the packet processor, successively make path selection decisions that correspond to respective routing domains within a hierarchical communication network that comprises a core network that interconnects a plurality of aggregation networks, the path selection decisions for forwarding the packet through the hierarchical communication network.

Embodiment 2: The network device of embodiment 1, wherein the path selection engine is configured to: make a first path selection decision for a first routing domain within the hierarchical communication network; use the first path selection decision to constrain a second path selection decision for a second routing domain within the hierarchical communication network; and make the second path selection decision based on the constraining of the second path selection decision.

Embodiment 3: The network device of embodiment 2, wherein: the path selection engine comprises one or more memory devices storing respective group selection tables that are configured to store i) path information corresponding to paths through the respective routing domains, and ii) group selection information that is configured to constrain subsequent path selections made by the path selection engine; and the path selection engine is configured to use group selection information retrieved from a first group selection table in connection with making the first path selection decision for a first routing domain within the hierarchical communication network to constrain the making of the second path selection decision for the second routing domain.

Embodiment 4: The network device of embodiment 3, wherein the path selection engine is configured to: use the group selection information retrieved from the first group selection table in connection with making the first path selection decision to select a set of entries in a second group selection table in connection with making the second path selection decision; and make the second path selection decision based on selecting one entry in the second group selection table from the set of entries in the second group selection table.

Embodiment 5: The network device of either of embodiments 3 or 4, further comprising a processor that is configured to: determine to re-route one or more paths through the first routing domain; and in response to determining to re-route the one or more paths through the first routing domain, overwrite one or more entries in a first group selection table corresponding to the first routing domain, including overwriting group selection information in the one or more entries that is configured to constrain subsequent path selections made by the path selection engine.

Embodiment 6: The network device of any of embodiments 1-5, wherein the path selection engine is configured to, for each path selection decision: determine a respective index into a respective header information table, and use the respective index to retrieve respective header information from the header information table; and wherein the packet processor further comprises a header modification engine configured to, for each of at least some packets, use header information retrieved from the header information tables by the path selection engine to add one or more headers to the packet.

Embodiment 7: The network device of embodiment 6, wherein the path selection engine is configured to: make a first path selection decision for a first routing domain within the hierarchical communication network; use the first path selection decision to generate a base pointer for a header information table corresponding to a second routing domain within the hierarchical communication network; and in connection with making a second path selection decision corresponding to the second routing domain: determine an index into the header information table corresponding to the second routing domain, and use the base pointer and the index into the header information table corresponding to the second routing domain to retrieve respective header information from the header information table corresponding to the second routing domain.

Embodiment 8: The network device of any of embodiments 1-7, wherein the path selection engine comprises: a plurality of hardware circuitry stages, each hardware circuitry stage configured to, for each of at least some packets processed by the packet processor, make a respective path selection decision that correspond to a respective routing domain within the hierarchical communication network.

Embodiment 9: The network device of any of embodiments 1-7, wherein the path selection engine comprises: shared circuitry that is configured to, for each of at least some packets processed by the packet processor, successively make path selection decisions that correspond to respective routing domains within a hierarchical communication network.

Embodiment 10: The network device of any of embodiments 1-9, wherein the path selection engine is configured to for each of at least some packets processed by the packet processor: successively make equal cost multipath (ECMP) path selection decisions that correspond to respective routing domains within the hierarchical communication network.

Embodiment 11: A method for processing packets in a network device, the method comprising: receiving packets via a plurality of network interfaces of the network device, the plurality of network interfaces coupled to a plurality of physical network links; and processing, by a packet processor of the network device, packets received via the plurality of network interfaces, including: for each of at least some packets processed by the packet processor, successively making path selection decisions that correspond to respective routing domains within a hierarchical communication network that comprises a core network that interconnects a plurality of aggregation networks, the path selection decisions for forwarding the packet through the hierarchical communication network.

Embodiment 12: The method for processing packets of embodiment 11, wherein successively making path selection decisions comprises: making a first path selection decision for a first routing domain within the hierarchical communication network; using the first path selection decision to constrain a second path selection decision for a second routing domain within the hierarchical communication network; and making the second path selection decision based on the constraining of the second path selection decision.

Embodiment 13: The method for processing packets of embodiment 12, successively making path selection decisions further comprises: in connection with making the first path selection decision for the first routing domain, retrieving, from a first group selection table, group selection information that is configured to constrain the second path selection decision for the second routing domain; wherein using the first path selection decision to constrain the second path selection decision comprises using the group selection information retrieved from the first group selection table to constrain the making of the second path selection decision for the second routing domain.

Embodiment 14: The method for processing packets of embodiment 13, wherein using the group selection information retrieved from the first group selection table to constrain the making of the second path selection decision for the second routing domain comprises: using the group selection information retrieved from the first group selection table to select a set of entries in a second group selection table in connection with making the second path selection decision; wherein making the second path selection decision comprises selecting one entry in the second group selection table from the set of entries in the second group selection table.

Embodiment 15: The method for processing packets of either of embodiments 13 or 14, further comprising: determining, by the network device, to re-route one or more paths through the first routing domain; and in response to determining to re-route the one or more paths through the first routing domain, overwriting, by the network device, one or more entries in a first group selection table corresponding to the first routing domain, including overwriting group selection information in the one or more entries that is configured to constrain subsequent path selections made by the packet processor.

Embodiment 16: The method for processing packets of any of embodiments 11-15, further comprising: for each path selection decision: determining a respective index into a respective header information table of the network device, and using the respective index to retrieve respective header information from the header information table; and for each of at least some packets, using header information retrieved from the header information tables to add one or more headers to the packet.

Embodiment 17: The method for processing packets of embodiment 16, wherein successively making path selection decisions comprises: making a first path selection decision for a first routing domain within the hierarchical communication network; and using the first path selection decision to generate a base pointer for a header information table corresponding to a second routing domain within the hierarchical communication network; wherein the method further comprises: in connection with making a second path selection decision corresponding to the second routing domain: determining an index into the header information table corresponding to the second routing domain, and using the base pointer and the index into the header information table corresponding to the second routing domain to retrieve respective header information from the header information table corresponding to the second routing domain.

Embodiment 18: The method for processing packets of any of embodiments 11-17, wherein successively making path selection decisions comprises: using a plurality of hardware circuitry stages of the packet processor to, for each of at least some packets processed by the packet processor, make a respective path selection decision that correspond to a respective routing domain within the hierarchical communication network.

Embodiment 19: The method for processing packets of any of embodiments 11-17, wherein successively making path selection decisions comprises: using shared circuitry of the packet processor to successively make path selection decisions that correspond to respective routing domains within a hierarchical communication network.

Embodiment 20: The method for processing packets of any of embodiments 11-19, wherein successively making path selection decisions comprises: successively making equal cost multipath (ECMP) path selection decisions that correspond to respective routing domains within the hierarchical communication network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more discrete components, an integrated circuit, an application-specific integrated circuit (ASIC), a programmable logic device (PLD), etc.

While the present disclosure has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of network interfaces configured to couple with a plurality of physical network links;
a plurality of header information tables configured to store header information to be included in tunnel headers that are to be added to packets by the network device, each header information table corresponding to a respective routing domain within a hierarchical communication network comprising a core network that interconnects a plurality of aggregation networks; and
a packet processor configured to process packets received via the plurality of network interfaces, the packet processor including a path selection engine that is configured to:
for each of at least some packets processed by the packet processor, successively make path selection decisions that correspond to the respective routing domains within the hierarchical communication network, the path selection decisions for forwarding the packet through the hierarchical communication network, and
for each path selection decision corresponding to the respective routing domain, select from a respective header information table, from among the plurality of header information tables, respective header information to be added to the packet as a corresponding tunnel header.

2. The network device of claim 1, wherein the path selection engine is configured to:
make a first path selection decision for a first routing domain within the hierarchical communication network;
use the first path selection decision to constrain a second path selection decision for a second routing domain within the hierarchical communication network; and
make the second path selection decision based on the constraining of the second path selection decision.

3. The network device of claim 2, wherein:
the path selection engine comprises one or more memory devices storing respective group selection tables that are configured to store i) path information corresponding to paths through the respective routing domains, and ii) group selection information that is configured to constrain subsequent path selections made by the path selection engine; and
the path selection engine is configured to use group selection information retrieved from a first group selection table in connection with making the first path selection decision for a first routing domain within the hierarchical communication network to constrain the making of the second path selection decision for the second routing domain.

4. The network device of claim 3, wherein the path selection engine is configured to:
use the group selection information retrieved from the first group selection table in connection with making the first path selection decision to select a set of entries in a second group selection table in connection with making the second path selection decision; and
make the second path selection decision based on selecting one entry in the second group selection table from the set of entries in the second group selection table.

5. The network device of claim 3, further comprising a processor that is configured to:
determine to re-route one or more paths through the first routing domain; and
in response to determining to re-route the one or more paths through the first routing domain, overwrite one or more entries in a first group selection table corresponding to the first routing domain, including overwriting group selection information in the one or more entries that is configured to constrain subsequent path selections made by the path selection engine.

6. The network device of claim 1, wherein:
the path selection engine is configured to, for each path selection decision:
determine a respective index into the respective header information table, and
use the respective index to retrieve the respective header information from the header information table; and
the packet processor further comprises a header modification engine configured to, for each of at least some packets, use header information retrieved from the header information tables by the path selection engine to add corresponding headers to the packet.

7. The network device of claim 6, wherein the path selection engine is configured to:
make a first path selection decision for a first routing domain within the hierarchical communication network;
use the first path selection decision to generate a base pointer for a header information table corresponding to a second routing domain within the hierarchical communication network; and
in connection with making a second path selection decision corresponding to the second routing domain:
determine an index into the header information table corresponding to the second routing domain, and
use the base pointer and the index into the header information table corresponding to the second routing domain to retrieve respective header information from the header information table corresponding to the second routing domain.

8. The network device of claim 1, wherein the path selection engine comprises:
a plurality of hardware circuitry stages, each hardware circuitry stage configured to, for each of at least some packets processed by the packet processor, make a respective path selection decision that correspond to a respective routing domain within the hierarchical communication network.

9. The network device of claim 1, wherein the path selection engine comprises:
shared circuitry that is configured to, for each of at least some packets processed by the packet processor, successively make path selection decisions that correspond to respective routing domains within a hierarchical communication network.

10. The network device of claim 1, wherein the path selection engine is configured to for each of at least some packets processed by the packet processor:
successively make equal cost multipath (ECMP) path selection decisions that correspond to respective routing domains within the hierarchical communication network.

11. A method for processing packets in a network device, the method comprising:

receiving packets via a plurality of network interfaces of the network device, the plurality of network interfaces coupled to a plurality of physical network links; and processing, by a packet processor of the network device, packets received via the plurality of network interfaces, including:

for each of at least some packets processed by the packet processor, successively making path selection decisions that correspond to respective routing domains within a hierarchical communication network that comprises a core network that interconnects a plurality of aggregation networks, the path selection decisions for forwarding the packet through the hierarchical communication network, and for each path selection decision corresponding to the respective routing domain, selecting from a respective header information table respective header information to be added to the packet as a respective header, the respective header information table from among a plurality of header information tables that i) store header information to be included in tunnel headers that are to be added to packets by the network device and ii) respectively correspond to the routing domains within the hierarchical communication network.

12. The method for processing packets of claim 11, wherein successively making path selection decisions comprises:

making a first path selection decision for a first routing domain within the hierarchical communication network;

using the first path selection decision to constrain a second path selection decision for a second routing domain within the hierarchical communication network; and making the second path selection decision based on the constraining of the second path selection decision.

13. The method for processing packets of claim 12, successively making path selection decisions further comprises:

in connection with making the first path selection decision for the first routing domain, retrieving, from a first group selection table, group selection information that is configured to constrain the second path selection decision for the second routing domain;

wherein using the first path selection decision to constrain the second path selection decision comprises using the group selection information retrieved from the first group selection table to constrain the making of the second path selection decision for the second routing domain.

14. The method for processing packets of claim 13, wherein using the group selection information retrieved from the first group selection table to constrain the making of the second path selection decision for the second routing domain comprises:

using the group selection information retrieved from the first group selection table to select a set of entries in a second group selection table in connection with making the second path selection decision;

wherein making the second path selection decision comprises selecting one entry in the second group selection table from the set of entries in the second group selection table.

15. The method for processing packets of claim 13, further comprising:

determining, by the network device, to re-route one or more paths through the first routing domain; and in response to determining to re-route the one or more paths through the first routing domain, overwriting, by the network device, one or more entries in a first group selection table corresponding to the first routing domain, including overwriting group selection information in the one or more entries that is configured to constrain subsequent path selections made by the packet processor.

16. The method for processing packets of claim 11, further comprising:

for each path selection decision:
determining a respective index into the respective header information table of the network device, and
using the respective index to retrieve the respective header information from the header information table; and for each of at least some packets, using header information retrieved from the header information tables to add corresponding headers to the packet.

17. The method for processing packets of claim 16, wherein successively making path selection decisions comprises:

making a first path selection decision for a first routing domain within the hierarchical communication network; and using the first path selection decision to generate a base pointer for a header information table corresponding to a second routing domain within the hierarchical communication network;

wherein the method further comprises: in connection with making a second path selection decision corresponding to the second routing domain:
determining an index into the header information table corresponding to the second routing domain, and
using the base pointer and the index into the header information table corresponding to the second routing domain to retrieve respective header information from the header information table corresponding to the second routing domain.

18. The method for processing packets of claim 11, wherein successively making path selection decisions comprises:

using a plurality of hardware circuitry stages of the packet processor to, for each of at least some packets processed by the packet processor, make a respective path selection decision that correspond to a respective routing domain within the hierarchical communication network.

19. The method for processing packets of claim 11, wherein successively making path selection decisions comprises:

using shared circuitry of the packet processor to successively make path selection decisions that correspond to respective routing domains within a hierarchical communication network.

20. The method for processing packets of claim 11, wherein successively making path selection decisions comprises:

successively making equal cost multipath (ECMP) path selection decisions that correspond to respective routing domains within the hierarchical communication network.

* * * * *